(12) United States Patent
Tanaka

(10) Patent No.: US 9,401,849 B2
(45) Date of Patent: Jul. 26, 2016

(54) NETWORK CONSTRUCTION SUPPORT SYSTEM AND METHOD

(71) Applicant: HITACHI, LTD., Chiyoda-ku, Tokyo (JP)

(72) Inventor: Yuji Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/239,879

(22) PCT Filed: Jul. 2, 2013

(86) PCT No.: PCT/JP2013/068092
§ 371 (c)(1),
(2) Date: Feb. 20, 2014

(87) PCT Pub. No.: WO2015/001611
PCT Pub. Date: Jan. 8, 2015

(65) Prior Publication Data
US 2016/0134484 A1    May 12, 2016

(51) Int. Cl.
| | |
|---|---|
| *G09G 5/00* | (2006.01) |
| *G06T 15/00* | (2011.01) |
| *H04L 12/24* | (2006.01) |
| *G06T 19/00* | (2011.01) |

(52) U.S. Cl.
CPC ............ *H04L 41/145* (2013.01); *G06T 19/006* (2013.01); *H04L 41/22* (2013.01)

(58) Field of Classification Search
None
See application file for complete search history.

(56) References Cited

U.S. PATENT DOCUMENTS

2013/0120449 A1    5/2013    Ihara et al.

FOREIGN PATENT DOCUMENTS

| JP | 4913913 B2 | 4/2012 |
|---|---|---|
| JP | 2012-152016 A | 8/2012 |

OTHER PUBLICATIONS

Written Opinion of the International Searching Authority; PCT Application No. PCT/JP2013/068092.

*Primary Examiner* — Jacinta M Crawford
(74) *Attorney, Agent, or Firm* — Mattingly & Malur, PC

(57) ABSTRACT

A network management apparatus is configured to manage a network apparatuses and to store the work information and an augmented reality presenting apparatus. A tag is added to the network apparatuses and each of the network cables, and each of the tags is provided with a visible object that conforms to the tag information that includes an ID of a target to which the tag has been added. The network management apparatus transmits the guide information that includes the information that indicates the contents of a work for the work target based on the tag information of the work target or the tag shot image of the work target and the work information to the augmented reality presenting apparatus. The augmented reality presenting apparatus associates a guide that is based on the guide information with an input image from the shooting device, and displays the guide and the input image.

10 Claims, 22 Drawing Sheets

Fig. 6

Network design/topology table 231

Node table 61

| Node ID | Type | Node name | Model ID | Status |
|---|---|---|---|---|
| N0001 | Router | Nodename1 | S0001 | Communication enabled |
| N0002 | Router | Nodename2 | S0002 | Communication enabled |
| N0003 | Switch | Nodename3 | S0003 | Communication disabled |
| N0004 | Switch | Nodename4 | S0004 | Activated (communication status is unclear) |

Network port table 62

| Port ID | Node ID | Port number | Status |
|---|---|---|---|
| P0001 | N0001 | 1 | Coupled |
| P0002 | N0001 | 2 | Not coupled |
| P0003 | N0002 | 1 | Coupled |
| P0004 | N0004 | 2 | Not coupled |

Cable table 63

| Cable ID | Port number 1 | Port number 2 | Cable usage period | Port number 1 status | Port number 2 status | Cable type |
|---|---|---|---|---|---|---|
| C0001 | P0001 | P0002 | 0 day | Coupled | Coupled | LAN (straight) |
| C0002 | P0003 | P0004 | 321 days | Coupled | Not coupled | LAN (straight) |

Fig. 7

Work list table

Work table (234, 71)

| Work ID | Work type ID | Work target ID | Cable ID | Dependency relationship | Status | Evidence ID |
|---|---|---|---|---|---|---|
| W0001 | V0001 | P0001 | C0001 | | Executed | E0001 |
| W0002 | V0001 | P0002 | C0001 | W0001 | Under execution | E0002 |
| W0003 | V0002 | P0003 | C0002 | | Unexecuted | Unexecuted |

Work type table (72)

| Work type ID | Guide message | Work result target status | Post-work status |
|---|---|---|---|
| V0001 | Couple a cable of a "cable ID" to a port of a "work target ID | Status of a "cable ID" | Coupled |
| V0002 | Uncouple a cable of a "cable ID" from a port of a "work target ID | Status of a "cable ID" | Not coupled |
| V0003 | Uncouple a cable of a "cable ID" from a port of a "work target ID, and couple them again after a certain period of time | Status of a "cable ID" | Coupled |

Evidence table (73)

| Evidence ID | Pre-work image | Post-work image |
|---|---|---|
| E0001 | xxxxx.jpg | xxxxx.jpg |
| E0002 | xxxxx.jpg | Unexecuted |

Network apparatus tag table

Cable tag table

Fig. 10

Network instrument appearance information table 233

Network model table

| Model ID 1011 | Model name 1012 |
|---|---|
| S0001 | xxxxx3630 |
| S0002 | xxxxx2430 |

Port location table

| Port location ID 1021 | Model ID 1022 | Port number 1023 | X-coordinate starting point 1024 | X-coordinate ending point 1025 | Y-coordinate starting point 1026 | Y-coordinate ending point 1027 |
|---|---|---|---|---|---|---|
| B0001 | S0001 | 1 | 0.091 | 0.113 | 0.2 | 0.36 |
| B0002 | S0001 | 2 | 0.091 | 0.113 | 0.48 | 0.64 |
| ... | | | | | | |
| B0013 | S0002 | 1 | 0.318 | 0.341 | 0.26 | 0.42 |
| ... | | | | | | |

Access lamp location table

| Lamp location ID 1031 | Model ID 1032 | Port number 1033 | X-coordinate starting point 1034 | X-coordinate ending point 1035 | Y-coordinate starting point 1036 | Y-coordinate ending point 1037 |
|---|---|---|---|---|---|---|
| A0001 | S0001 | 1 | 0.114 | 0.117 | 0.16 | 0.19 |
| A0002 | S0001 | 2 | 0.114 | 0.117 | 0.44 | 0.47 |
| ... | | | | | | |
| A0013 | S0002 | 1 | 0.342 | 0.344 | 0.26 | 0.28 |
| ... | | | | | | |

Node name: Nodename2
Work contents: Couple cable of "cable ID" to port of "work target ID"
Abnormality contents: Cannot communicate with Nodename2

Evidence image:

Image display

NETWORK CONSTRUCTION SUPPORT SYSTEM AND METHOD

TECHNICAL FIELD

The present invention generally relates to a network management.

BACKGROUND ART

A network management, in particular, the construction or a modification work of a network system is carried out while viewing a network drawing that is prepared by a network manager or a connection table of network apparatuses most commonly. However, a network system has been complicated from year to year, and carrying out a network connection work while viewing a network drawing or a connection table is quite a burden for a worker who executes a connection work as a practical matter. Moreover, in the case in which a connection work is executed, a port to which a network cable is inserted may be mistaken or a network cable is not successfully inserted in some cases, thereby preventing a network system from being operated even after a connection work is completed in some cases.

On the other hand, as a technique for additionally presenting the virtual information to a real space by using a computer, an augmented reality (AR) technique is known publicly (see Patent Literature 1).

CITATION LIST

Patent Literature

[PTL 1]
Japanese Patent No. 4913913

SUMMARY OF INVENTION

Technical Problem

In the case in which the AR technique can be applied to the network management, it is thought that a work burden of a construction of a network system can be relieved. However, the AR technique cannot be applied to the network construction in a simplistic form.

Solution to Problem

There are a network management apparatus that is configured to manage a plurality of network apparatuses and to store the work information and an augmented reality presenting apparatus. A tag is added to each of the network apparatuses and each of the network cables, and each of the tags is provided with a visible object that conforms to the tag information that includes an ID of a target to which the tag has been added. The work information includes the information that indicates a relationship between the tag information and the work target and the information that indicates the contents of a work that is to be executed for the work target. The network management apparatus transmits the guide information that includes the information that indicates the contents of a work for the work target based on the tag information of the work target or the tag shot image of the work target and the work information to the augmented reality presenting apparatus. The augmented reality presenting apparatus associates a guide that is based on the guide information with an input image that is input from the shooting device, and displays the guide and the input image.

BRIEF DESCRIPTION OF DRAWINGS

FIG. 6 is a view showing the configuration of a network design/topology table.
FIG. 7 is a view showing the configuration of a work list table.
FIG. 10 is a view showing the configuration of a network instrument appearance information table.

DESCRIPTION OF EMBODIMENTS

Figure 1:
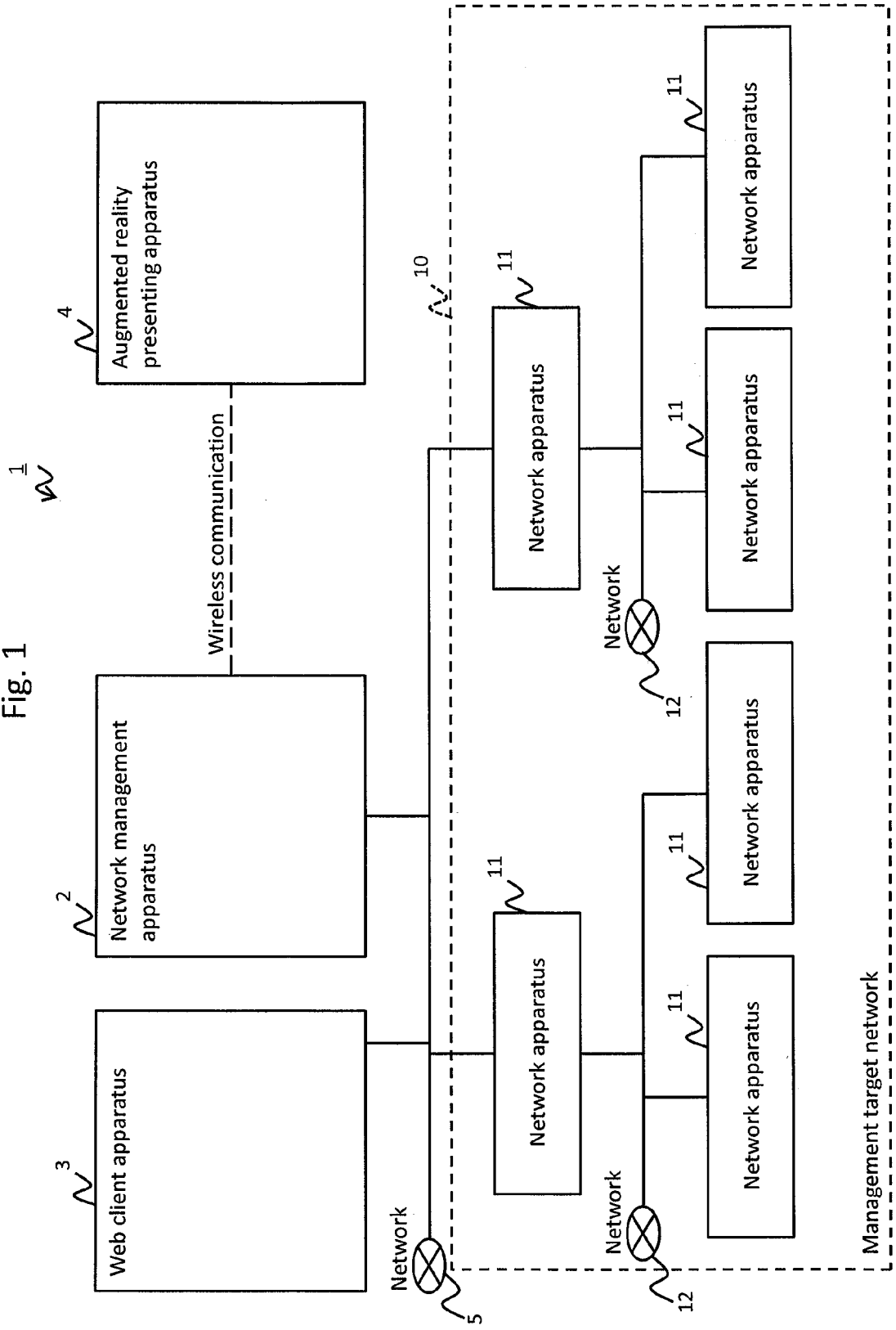
FIG. 1 is a view showing the configuration of a computer system in accordance with an embodiment of the present invention.

An embodiment for the present invention will be described with reference to the drawings in the following.

In the following descriptions, while the information in accordance with the present embodiment will be described in the expression such as "aaa table", the information can also be represented by other than the data structure such as a table. In order to indicate that the information is not depended on a data structure, the expression of "aaa table" can also be referred to as "aaa information" in some cases.

In the following descriptions, while the expression of "name" or "ID" is used in the case in which the contents of each of the information are described, the identification information of other kind can also be used as substitute for at least one of those.

In the following descriptions, the processing will be described while a "program" is handled as a subject in some cases. In the case in which the program is executed by a processor (for instance, a CPU (Central Processing Unit)), the predetermined processing is executed by using a memory and a communication port (a communication control device). Consequently, a subject of a processing can also be a processor. The processing that is disclosed while a program is handled as a subject can also be a processing that is executed by a computer such as a network management apparatus or an information processing apparatus. Moreover, a part or a whole of a program can be implemented by the dedicated hardware.

A wide variety of programs can be installed to each of the computers by a program distribution server or a storage medium that can be read by a computer (computer-readable memory media). In this case, the program distribution server includes a CPU and a storage resource, and the storage resource further stores a distribution program and a distribution target program. In the case in which the CPU executes the distribution program, the CPU of the program distribution server distributes a program of a distribution target to other computer.

A network management apparatus is provided with an input/output device. In the present embodiment, a serial interface and an Ethernet (registered trademark) interface are input/output devices, and a web client apparatus as a display computer that is provided with a display, a keyboard, or a pointer device is coupled to the interfaces. In the case in which the display information is transmitted to the web client apparatus or the input information is received from the web client apparatus, the web client apparatus executes a display or receives an input. However, the present invention is not restricted to the above configurations, and an input/output device can also be coupled to the network management apparatus in a direct manner. As an example of an input/output device that is coupled to the network management apparatus, a display, a keyboard, and a pointer device can be mentioned for instance. However, a device other than the above can also be used.

In the following, an aggregate of at least one computer that is configured to manage a management target network and to display the display information may be called "a management system". In the case in which the network management apparatus displays the display information, the network management apparatus is a management system. Moreover, a combination of the network management apparatus and the web client apparatus as a display computer is also a management system. A processing that is equivalent to the network management apparatus can also be implemented by using a plurality of computers for speeding up and increasing reliability for a management processing. In this case, the plurality of computers is a management system (in the case in which a display is executed by the web client apparatus, the web client apparatus can also be included in the plurality of computers).

FIG. 1 is a view showing the configuration of a computer system in accordance with an embodiment of the present invention.

A computer system 1 is provided with a network system 10 that is a management target (hereafter referred to as a management target network system in some cases), a network management apparatus 2 that is configured to manage a coupling status of the management target network system 10, a web client apparatus 3, and an augmented reality presenting apparatus 4.

The web client apparatus 3 and the network management apparatus 2 are coupled to the management target network 10 via a communication network 5 (such as the Internet).

The augmented reality presenting apparatus 4 and the network management apparatus 2 execute a wireless communication. A communication of the apparatus can also be a wire communication.

For the network system 10, a plurality of network apparatuses 11 are coupled to each other via at least one communication network 12 (such as a LAN (Local Area Network)).

Figure 2:
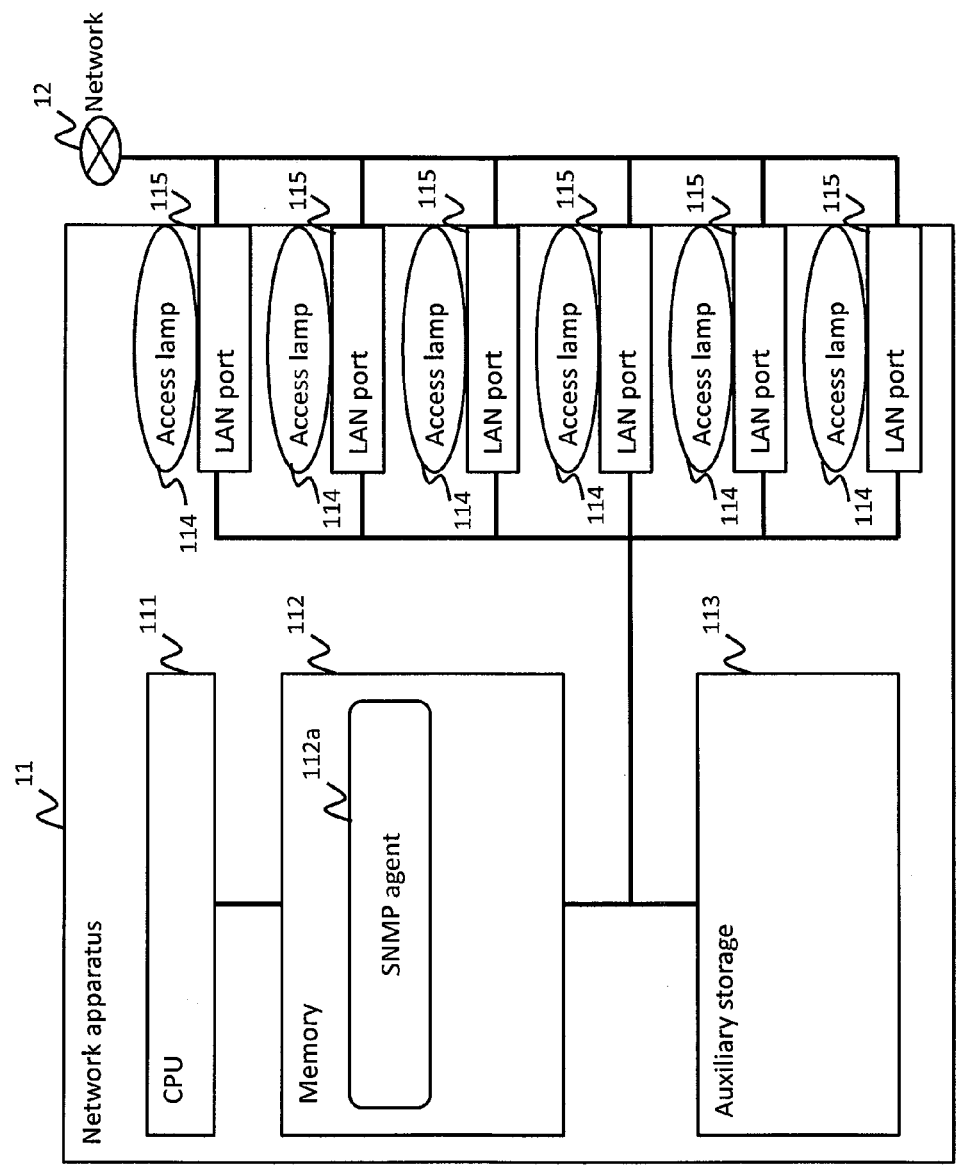
FIG. 2 is a view showing the configuration of a network apparatus.

FIG. 2 is a view showing the configuration of a network apparatus 11.

The network apparatus 11 is an apparatus that is coupled to the network 12. More specifically, the network apparatus 11 is an apparatus such as a hub, a switch, a router, and a terminal apparatus.

The network apparatus 11 is provided with a memory 112, an auxiliary storage device 113, at least one port (LAN port in the present embodiment) 115 to which a network cable 12a (see FIG. 23) can be coupled, at least one access lamp 114, and a CPU 111 that is coupled to those. The access lamp 114 is located adjacent to the LAN port 115. A lighting mode of the access lamp 114 is a mode that is corresponded to a communication status of the LAN port 115 that is located adjacent to the access lamp 114. The communication status may be whether or not a communication is executed or whether or not a communication status is satisfactory (whether or not a transfer rate is equal to or higher than a predetermined value) for instance. A difference of a lighting mode is at least one of any one of lighting and extinction (and blinking) and a difference of a color for instance, and the communication status can be known by a lighting mode. A comparative location of the access lamp 114 to the LAN port 115 is not restricted to an adjacence, and can also be any location such as a neighborhood as long as a correspondence relationship between the LAN port 115 and the access lamp 114 is clear.

Figure 23A:
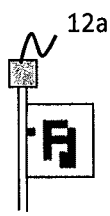
FIG. 23A is a view showing an example of a network cable to which a tag has been added.
Figure 23B:
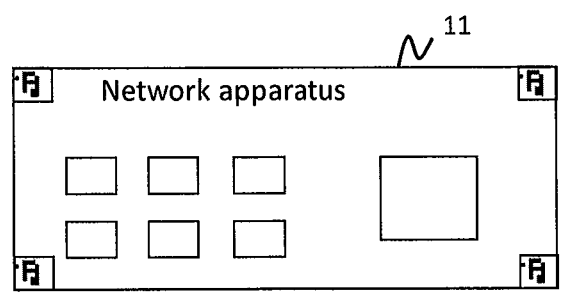
FIG. 23B is a view showing an example of a network apparatus to which a tag has been added.

A tag is added to each of the network apparatuses 11 and each of the network cables 12a. FIG. 23A is a view showing an example of a network cable 12a to which a tag has been added. FIG. 23B is a view showing an example of a network apparatus 11 to which a tag has been added. Each of the tags is provided with a visible object that conforms to the tag information that includes an ID of a network apparatus 11 to which the tag has been added or a network cable 12a to which a tag has been added. The visible object is a mark in which the information is imaged by using a predetermined algorithm such as a two-dimensional bar code. The visible object is not restricted to a pattern in which the information is converted by using a predetermined algorithm such as a two-dimensional bar code, and can also be an object of other type such as a text that indicates an ID itself. In this case, an ID can be identified by analyzing a shot image of the text by using a character recognition technique.

The CPU 111 executes a computer program (hereafter referred to as a program) that has been stored in the memory 112.

The memory 112 temporarily stores an instruction and data that have been received by the network apparatus 11 and stores a program. A program can also be stored in the auxiliary storage device 113. In this case, a program is loaded to the memory 112. In the present embodiment, the network apparatus 11 is provided with the memory 112 and the auxiliary storage device 113 as a storage device. However, the auxiliary storage device 113 is not an essential composition element for the network apparatus 11.

A program that is stored in the memory 112 is an SNMP agent 112a for instance. The SNMP agent 112a is configured to communicate with the network management apparatus 2 (or other external management apparatus) and to provide the routing information and the information that is related to a communication for instance.

Figure 3:
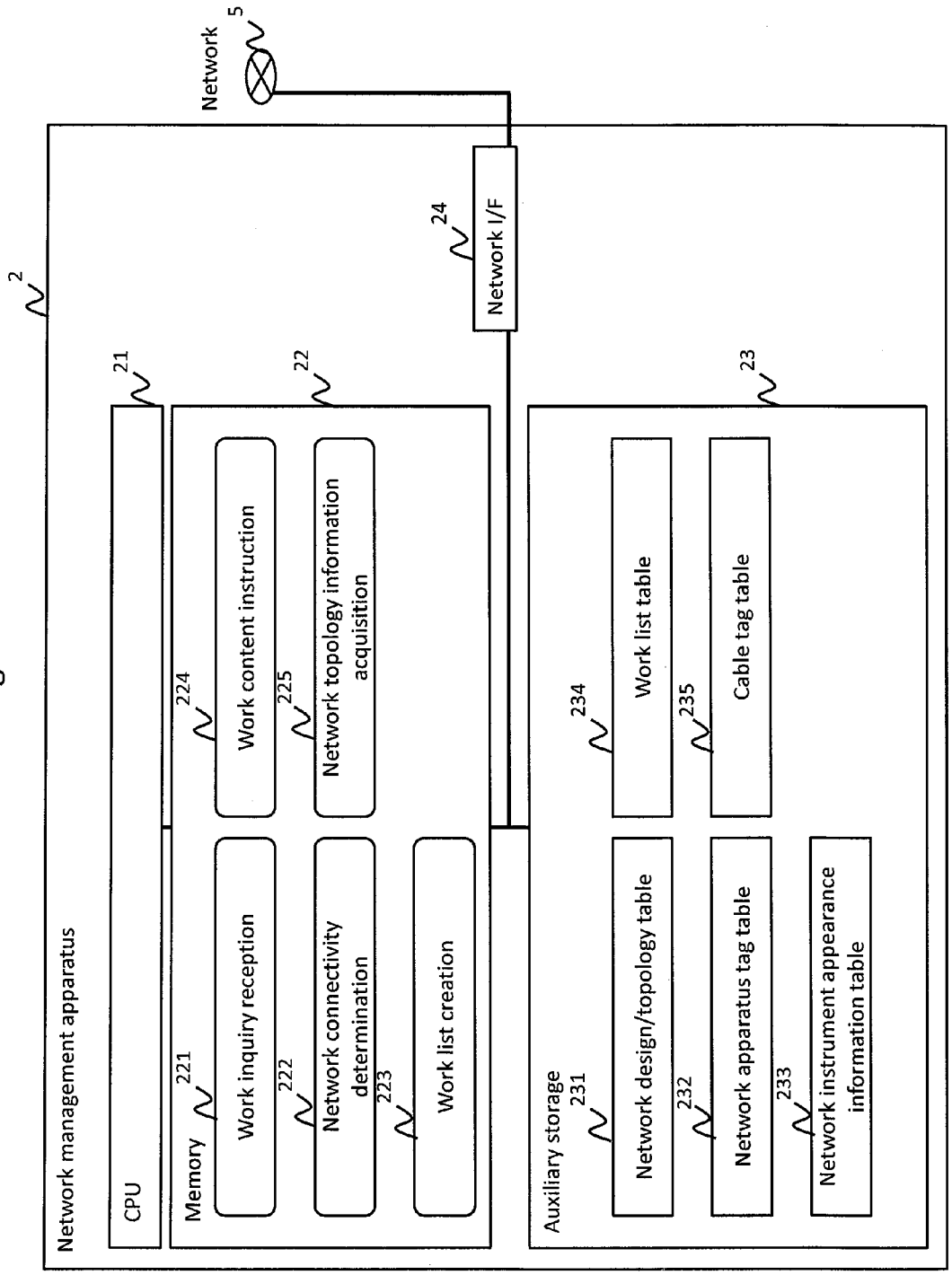
FIG. 3 is a view showing the configuration of a network management apparatus.

FIG. 3 is a view showing the configuration of a network management apparatus 2.

The network management apparatus 2 is provided with a memory 22, an auxiliary storage device 23, a network interface device (hereafter referred to as a network I/F in some cases) 24, and a CPU 21 that is coupled to those. The network management apparatus 2 may be a general-purpose computer for instance. The CPU 21 executes a program that has been stored in the memory 22.

The memory 22 stores a wide variety of programs and temporarily stores an instruction and data that have been received via the network 5. More specifically, the memory 22 stores a work inquiry reception program 221, a network connectivity determination program 222, a work list creation program 223, a work content instruction program 224, and a network topology information acquisition program 225 for instance. A part or a whole of the programs 221 to 225 can be stored in the auxiliary storage device 23, and the program is loaded to the memory 22. The details of the programs 221 to 225 will be described later. In the following descriptions, the above programs may be described as a work inquiry reception 221, a network connectivity determination 222, a work list creation 223, a work content instruction 224, and a network topology information acquisition 225 in a simple manner in some cases.

The auxiliary storage device 23 stores a wide variety of tables. More specifically, the auxiliary storage device 23 stores a network design/topology table 231, a network apparatus tag table 232, a network instrument appearance information table 233, a work list table 234, and a cable tag table 235 for instance. A part or a whole of the tables 231 to 235 can be stored in the memory 22.

The network I/F 24 executes a transmission and a reception with a wide variety of terminal apparatuses via the network 5.

Figure 4:
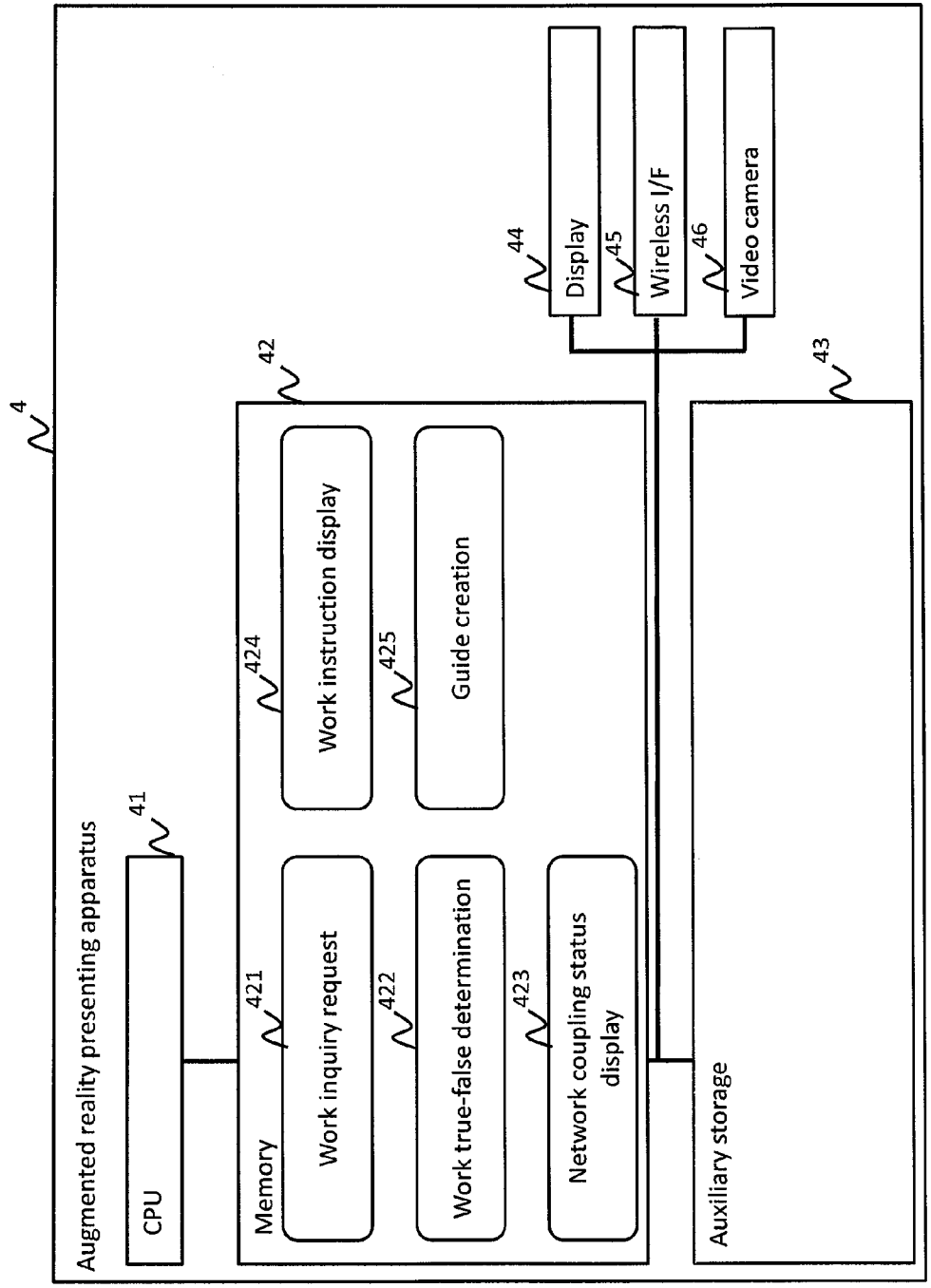
FIG. 4 is a view showing the configuration of an augmented reality presenting apparatus.

FIG. 4 is a view showing the configuration of an augmented reality presenting apparatus 4.

The augmented reality presenting apparatus 4 is an information processing apparatus (such as a communication terminal) that is provided with a shooting function, a display function, and a communication function. More specifically, the augmented reality presenting apparatus 4 may be a smartphone, a tablet type terminal, and a goggle type terminal for instance.

The augmented reality presenting apparatus 4 is provided with a memory 42, an auxiliary storage device 43, a display device 44, a wireless interface device 45 (hereafter referred to as a wireless I/F in some cases), a video camera 46 as a shooting device, and a CPU 41 that is coupled to those.

The CPU 41 executes a program that has been stored in the memory 42.

The memory 42 stores a wide variety of programs and temporarily stores an instruction and data that have been received via the wireless interface device 45. More specifically, the memory 42 stores a work inquiry request program 421, a work true-false determination program 422, a network coupling status display program 423, a work instruction display program 424, and a guide creation program 425 for instance. A part or a whole of the programs 421 to 425 can be stored in the auxiliary storage device 43, and the program is loaded to the memory 42. The details of the programs 421 to 425 will be described later. In the following descriptions, the above programs may be described as a work inquiry request 421, a work true-false determination 422, a network coupling status display 423, a work instruction display 424, and a guide creation 425 in a simple manner in some cases.

The auxiliary storage device 43 can store a wide variety of programs and data. The wireless I/F 45 is an interface device that is configured to communicate with an external apparatus.

The video camera 46 inputs an image (a moving image or a still image) through a lens that is not shown in a figure, and stores the image that has been input into the memory 42. The display device 44 displays a wide variety of screens (such as a menu screen for selecting a shooting mode) and an image that has been input and stored in the memory 42 for instance. In the present embodiment, the display device 44 is a touch panel type display device, that is, a display device that is integrated with an input device. However, a display device of other type can also be adopted. For instance, a display device and an input device (such as a user interface input device) can also be configured in a separate manner.

The CPU 41 is configured to display an input image that has been input by the video camera 46 and that has been stored in the memory 42 (such as a work area) to the display device 44. Moreover, in the case in which the CPU 41 receives a shooting instruction of a still image or a moving image through the display device 44, the CPU 41 stores an input image that has been input by the video camera 46 and that has been stored in the memory 42 as a still image or a moving image into the auxiliary storage device 43 (or a specific area for the memory 42 (an area other than a work area)). In the following, an input image that has been input by the video camera 46, that has been stored in the memory 42, and that has been stored in accordance with a shooting instruction is referred to as a "shot image" in particular in some cases.

Figure 5:
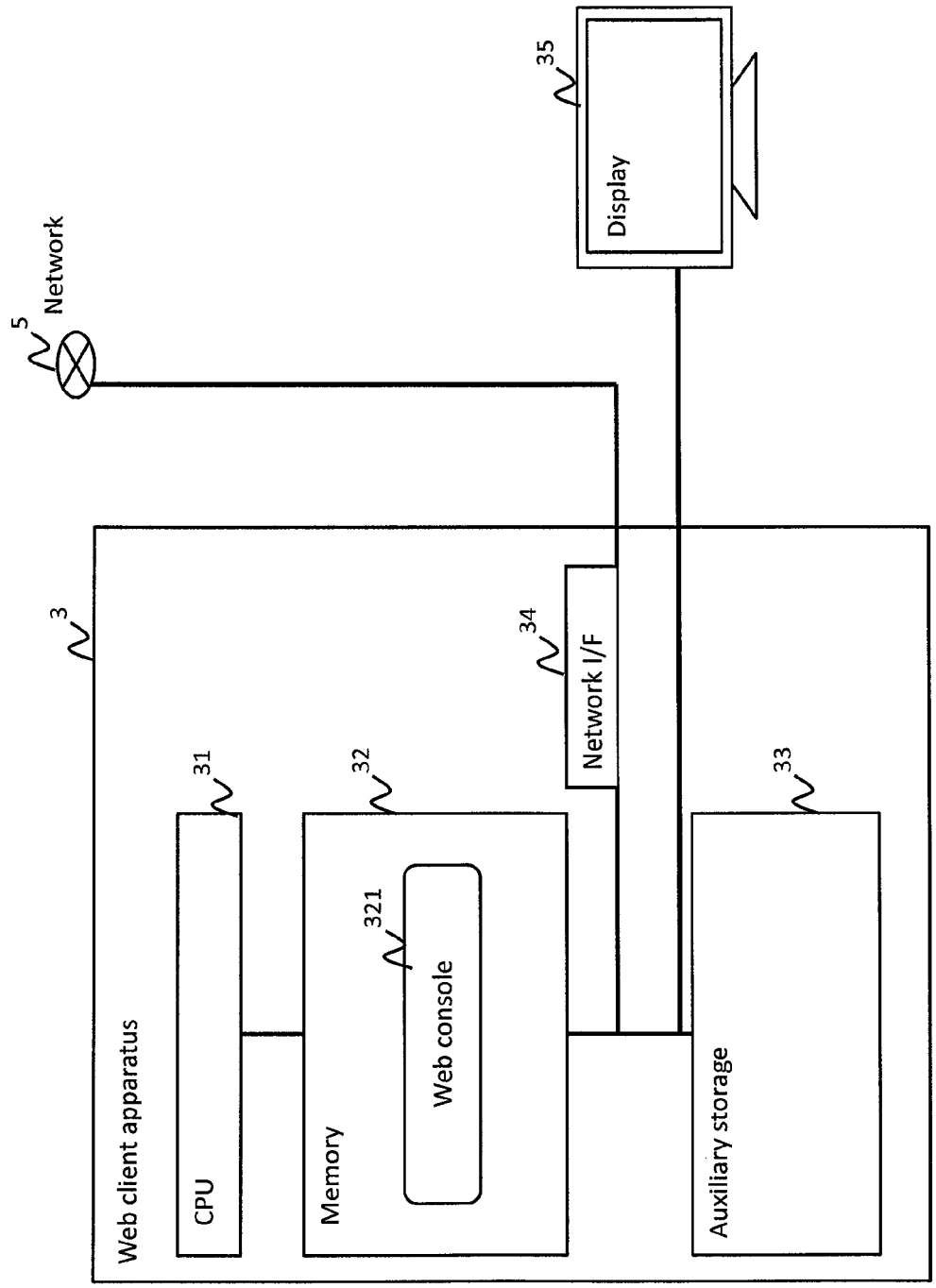
FIG. 5 is a view showing the configuration of a web client apparatus.

FIG. 5 is a view showing the configuration of a web client apparatus 3.

The web client apparatus 3 is provided with a memory 32, an auxiliary storage device 33, a network interface device 34 (hereafter referred to as a network I/F in some cases), a display device 34, and a CPU 31 that is coupled to those. The web client apparatus 3 may be a general-purpose computer such as a desktop type personal computer and a tablet type terminal for instance. The display device 34 can be coupled to the web client apparatus 3 or can be a device that is integrated with the web client apparatus 3.

The CPU 31 executes a program that has been stored in the memory 32. The memory 32 stores a wide variety of programs and temporarily stores an instruction and data that have been received via the network 5. More specifically, the memory 32 stores a web console 321 as a program for instance. In the case in which the web console 321 is executed, the web client apparatus 3 can execute a remote operation to the network management apparatus 2.

FIG. 6 is a view showing the configuration of a network design/topology table 231.

The network design/topology table 231 is provide with a node table 61, a network port table 62, and a cable table 63.

The node table 61 is a table that indicates the information of a plurality of network apparatuses 11 as a node for the management target network 10. More specifically, the node table 61 is provide with the following information for every network apparatus 11 for instance:

(*) Node ID 611 that is an identifier of the network apparatus;
(*) Type 612 of the network apparatus;

(\*) Node name 613 that is a name of the network apparatus;
(\*) Model ID 614 that is an identifier for every type 612; and
(\*) Status 615 that indicates an operation status of the network apparatus.

For the node table 61, the network apparatus of a node ID 611 of "N0001" is a router in which a model ID 614 is "S0001" and a node name 613 is "Nodename1", and is in the communication enabled status for instance.

The network port table 62 is a table that indicates the information of a plurality of LAN ports 115 that are included in a plurality of network apparatuses 11 of the management target network 10. More specifically, the network port table 62 is provide with the following information for every LAN port 115 for instance:
(\*) Port ID 621 that is an identifier of the LAN port;
(\*) Node ID 622 that is an identifier of a network apparatus that is provided with the LAN port;
(\*) Port number 623 that is a name of the LAN port; and
(\*) Status 624 that indicates a coupling status of the LAN port.

For the network port table 62, the network apparatus that is provided with a node ID 622 of "N0001" is provided with a LAN port in which the port ID 621 is "P0001" and the port number 623 is "1" and a LAN port in which the port ID 621 is "P0002" and the port number 623 is "2" for instance. The LAN port "P0001" has been coupled, and the LAN port "P00012" has not been coupled.

The cable table 63 is a table that indicates the information of a network cable 12a that couples two network apparatuses 11 to each other. More specifically, the cable table 63 is provide with the following information for every cable for instance:
(\*) Cable ID 631 that is an identifier of the cable;
(\*) Port number 1 (632) that indicates a port of a coupling destination of one side of the cable;
(\*) Port number 2 (633) that indicates a port of a coupling destination of the other side of the cable;
(\*) Cable usage period 634 that indicates the number of days from the start of coupling of the cable;
(\*) Port number 1 status 635 that indicates a coupling status of the port number 1 (632);
(\*) Port number 2 status 636 that indicates a coupling status of the port number 2 (633); and
(\*) Cable type 637 that indicates a type of the cable.

For the cable table 63, the network cable that is provided with a cable ID 631 of "C0001" is a LAN (straight) cable of which one side is coupled to a LAN port "P0001" and the other side is coupled to a LAN port "P0002" for instance. Moreover, the LAN ports are in the status in which the LAN ports have been coupled.

FIG. 7 is a view showing the configuration of a work list table 234.

The work list table 234 is provided with a work table 71, a work type table 72, and an evidence table 73 as the work information that is related to a coupling work for a network cable 12a and the network apparatus 11.

The work table 71 is a table that indicates the information of a coupling work. More specifically, the work table 71 is provide with the following information for every work for instance:
(\*) Work ID 711 that is an identifier of a work;
(\*) Work type ID 712 that indicates a type of a work;
(\*) Work target ID 713 that indicates a target of a work;
(\*) Cable ID 714 of a cable that is coupled in the case in which a work target is a port;
(\*) Dependency relationship 715 that indicates an identifier of a work that is related to a work of a target;
(\*) Status 716 that indicates whether or not a work has been completed; and
(\*) Evidence ID 717 that indicates an identifier of an evidence of an executed work.

For the work table 71, a target of a work is a port ID or an ID that indicates an electrical power switch for instance. Moreover, in the case in which a work of a target is a coupling work of one side of a cable, a dependency relationship 715 is a coupling work of the other side for instance. A work of an ID of "W0001" is a work type of "V0001" and a LAN port that is provided with an ID of a work target of "P0001". This work has been executed, and an evidence ID of the work is "E0001".

The work type table 72 is a table that indicates the work contents for every work type. This table 72 is registered by a manager in advance. More specifically, the work type table 72 is provide with the following information for every work type for instance:
(\*) Work type ID 721 that is an identifier of a work type;
(\*) Guide message 722 that is displayed as a guide of a work;
(\*) Work target status 723; and
(\*) Post-work status 724.

For the work type table 72, in the case of a work of a work type ID of "V0001", a display device 44 of an augmented reality presenting apparatus displays a guide of "couple a cable of a "cable ID" to a port of a "work target ID"" for instance. Moreover, in the case in which a coupling work of each port is completed for a work of this type, a status of each port for a cable table and a network port table is set to "coupled".

The evidence table 73 is a table that indicates an evidence of a work. More specifically, the evidence table 73 is provide with the following information for every work for instance:
(\*) Evidence ID 731 that is an identifier of an evidence;
(\*) Pre-work image 732 that is an image of a work point that is shot before a work; and
(\*) Post-work image 733 that is an image of a work point that is shot after a work.

In the case in which an image before a work or after a work is associated with an evidence ID, a kind of a work that has been executed can be confirmed at one view.

Figure 8:
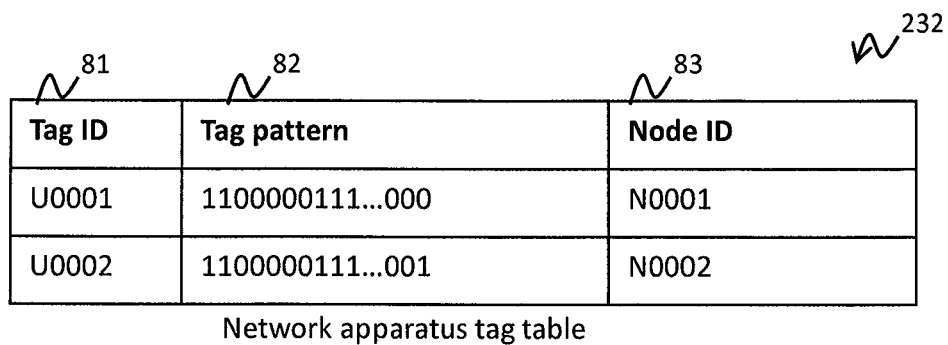
FIG. 8 is a view showing the configuration of a network apparatus tag table.

FIG. 8 is a view showing the configuration of a network apparatus tag table 232.

The network apparatus tag table 232 is a table that indicates the information that is related to a tag that is added to the network apparatus 11. More specifically, the network apparatus tag table 232 is provide with the following information for every network apparatus for instance:
(\*) Tag ID 91 of a tag that is added to the network apparatus;
(\*) Tag pattern 92 that indicates a pattern in the case in which a tag is analyzed; and
(\*) Node ID 93 that is an identifier of the network apparatus.

For the network apparatus tag table 232, a tag of an ID of "U0001" is added to a network apparatus that is provided with a node ID of "N00001" and a tag pattern thereof is "1100000111 . . . 000" for instance.

Figure 9:
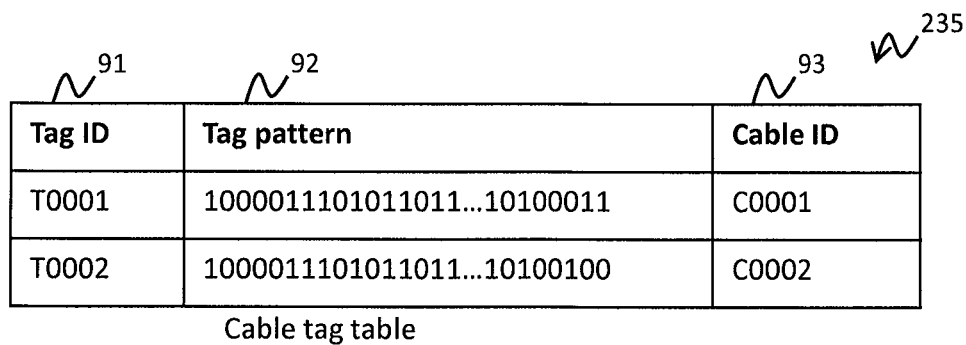
FIG. 9 is a view showing the configuration of a cable tag table.

FIG. 9 is a view showing the configuration of a cable tag table 235.

The cable tag table 235 is a table that indicates the information that is related to a tag that is added to a cable. More specifically, the cable tag table 235 is provide with the following information for every cable for instance:
(\*) Tag ID 81 of a tag that is added to a cable;
(\*) Tag pattern 82 that indicates a pattern in the case in which a tag is analyzed; and
(\*) Cable ID 83 that is an identifier of a cable.

For the cable tag table 235, a tag of an ID of "T0001" is added to a cable that is provided with a cable ID of "C0001" and a tag pattern thereof is "1000011101011011 . . . 10100011" for instance.

As described above, a "tag" is added to each of a plurality of network apparatuses 11 and a plurality of network cables 12a, and is provided with a visible object that conforms to the tag information that includes an ID of the network apparatus 11 or the network cable 12a to which the tag has been added. In the case in which a visible object of a tag that has been shot is analyzed, the tag information can be extracted. The analysis of a visible object is executed by the augmented reality presenting apparatus 4 in the present embodiment. However, the analysis of a visible object can also be executed by the network management apparatus 2 as substitute for the augmented reality presenting apparatus 4.

FIG. 10 is a view showing the configuration of a network instrument appearance information table 233.

The network instrument appearance information table 233 is provided with a network model table 101, a port location table 102, and an access lamp location table 103 as the location information of a LAN port 115 and an access lamp 114 to the network apparatus 11.

The network model table 101 is a table that indicates a type of the network apparatus 11. More specifically, a model ID 1011 and a model name 1012 of the network apparatus are corresponded to each other for the network model table 101 for instance.

The port location table 102 is a table that indicates the location information of the LAN port 115. More specifically, the port location table 102 is provide with the following information for every LAN port for instance:
(*) Port location ID 1021 that is an identifier to a location of a LAN port;
(*) Model ID 1022 that is an identifier for every type of the network apparatus that is provided with a LAN port;
(*) Port number 1023 that is a name of a LAN port;
(*) X-coordinate starting point 1024 that is a starting point in a direction of the X axis as the location information of a LAN port;
(*) X-coordinate ending point 1025 that is an ending point in a direction of the X axis as the location information of a LAN port;
(*) Y-coordinate starting point 1026 that is a starting point in a direction of the Y axis as the location information of a LAN port; and
(*) Y-coordinate ending point 1027 that is an ending point in a direction of the Y axis as the location information of a LAN port.

Figure 22:
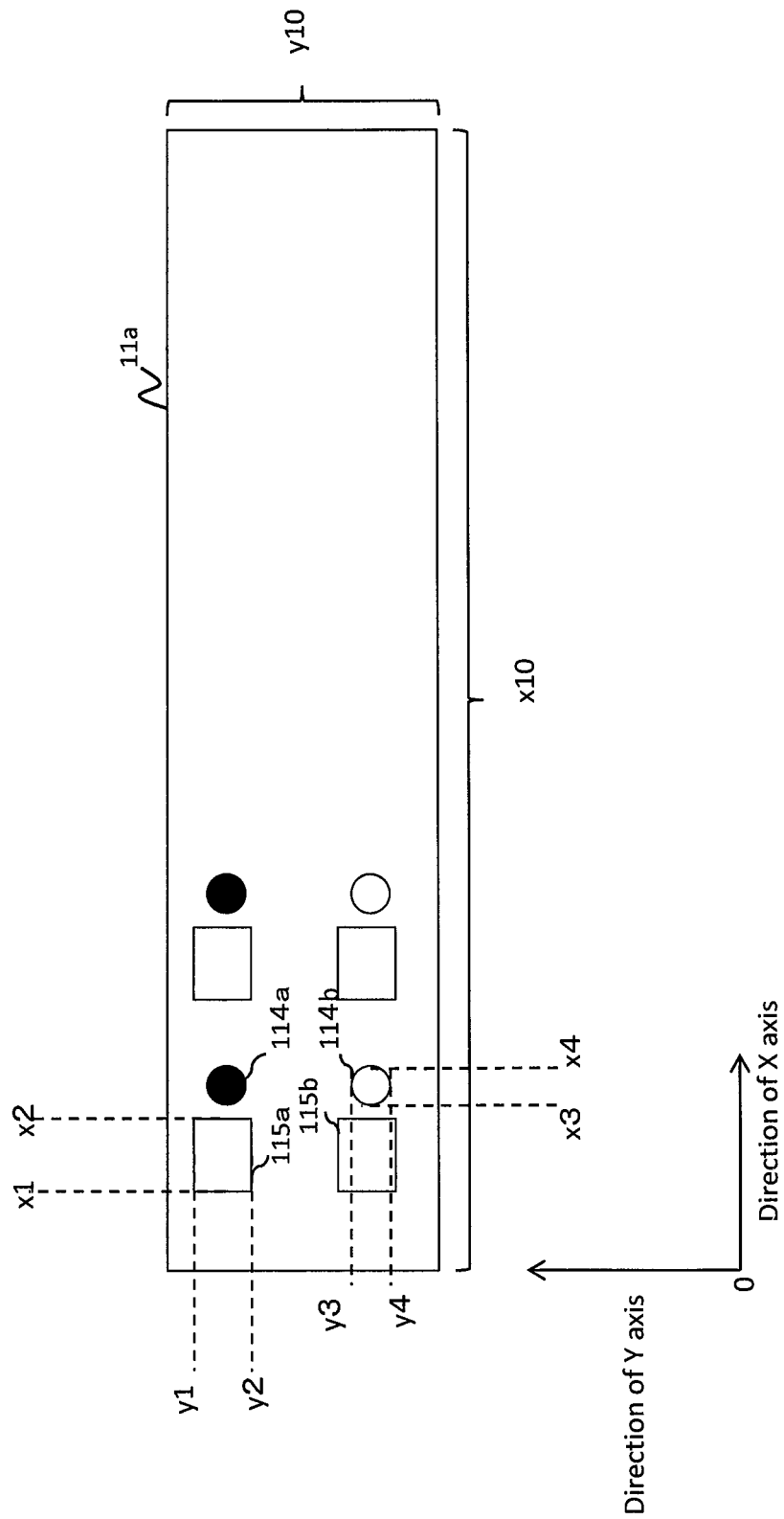
FIG. 22 is a view showing an example of a face including a LAN port of a network apparatus.

A face (front face) that includes a LAN port of the network apparatus 11 is a plane of the X and Y coordinates, and the location information of a LAN port indicates the coordinates of a starting point and an ending point in a direction of the X axis and in a direction of the Y axis of the LAN port 115 for the plane of the X and Y coordinates. More specifically, as shown in FIG. 22, the X-coordinate starting point of the LAN port 115a is x1, the X-coordinate ending point is x2, the Y-coordinate starting point is y1, and the Y-coordinate ending point is y2 for instance. The locations may be indicated by using a rate regardless of only a distance from a point of origin. For instance, the locations can also be the rates of a starting point x1 and an ending point x2 of the X coordinate to a total length x10 of the X axis of the face 11a and the rates of a starting point y1 and an ending point y2 of the Y coordinate to a total length y10 of the Y axis of the face 11a.

The access lamp location table 103 is a table that indicates the location information of the access lamp 14. More specifically, the access lamp location table 103 is provide with the following information for every access lamp for instance:
(*) Lamp location ID 1031 that is an identifier to a location of an access lamp;
(*) Model ID 1032 that is an identifier for every type of the network apparatus that is provided with an access lamp;
(*) Port number 1023 that is a name of a LAN port that is corresponded to an access lamp;
(*) X-coordinate starting point 1034 that is a starting point in a direction of the X axis as the location information of an access lamp;
(*) X-coordinate ending point 1035 that is an ending point in a direction of the X axis as the location information of an access lamp;
(*) Y-coordinate starting point 1036 that is a starting point in a direction of the Y axis as the location information of an access lamp; and
(*) Y-coordinate ending point 1037 that is an ending point in a direction of the Y axis as the location information of an access lamp.

The location information of an access lamp indicates the coordinates of a starting point and an ending point in a direction of the X axis and in a direction of the Y axis of the access lamp for the plane of the X and Y coordinates. As shown in FIG. 22, the X-coordinate starting point of the access lamp 114b is x3, the X-coordinate ending point is x4, the Y-coordinate starting point is y3, and the Y-coordinate ending point is y24 for instance. The locations may be indicated by using a rate regardless of only a distance from a point of origin. For instance, the locations can also be the rates of a starting point x3 and an ending point x4 of the X coordinate to a total length x10 of the X axis of the face 11a and the rates of a starting point y3 and an ending point y4 of the Y coordinate to a total length y10 of the Y axis of the face 11a.

In accordance with a plurality of tables described above, a node ID, a port ID (a work target ID), and a cable ID are corresponded to each work ID. By this configuration, a manager can easily confirm whether or not a work has been executed to a target resource in an appropriate manner by a wide variety of processing describer later.

Figure 20:
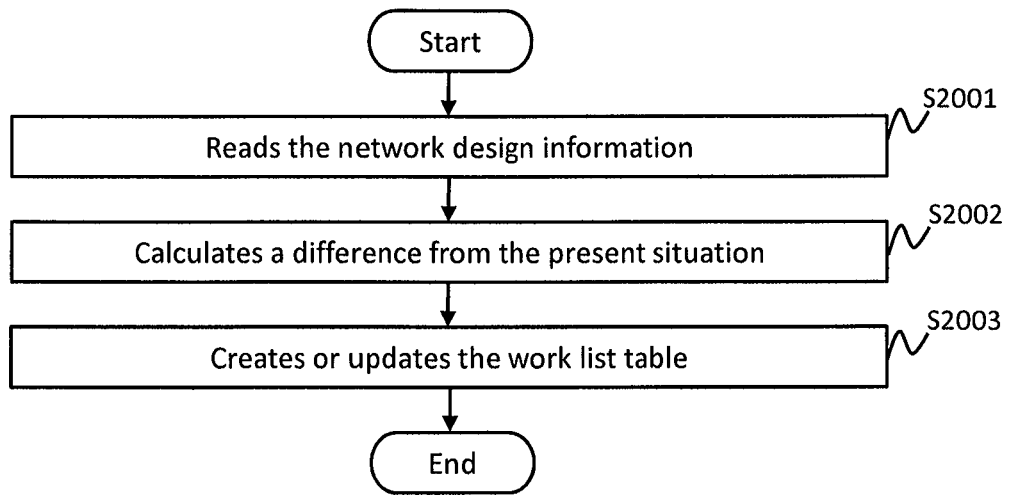
FIG. 20 is a flowchart of a work list creation processing.

FIG. 20 is a flowchart of a work list creation processing.

The work list creation processing is a processing that is executed by the work list creation program 223 in order to create or update a work list 234. The processing is executed in the case in which the management target network 10 is configured, and can also be executed in a constant manner after that.

In the step S2001, the program 223 reads the network design information. More specifically, the network design information is the information that indicates a completed coupling status of the management target network 10, such as a coupling status of a port 15 and a cable for a network apparatus 11 that is indicated for instance. The network design information can be a network design drawing and can also be the information that is indicated by using other format. Moreover, the network design information can be defined by a manager and can be input from an input device not shown for instance.

In the step S202, the program 223 calculates a difference between the network design information and a current coupling status of the management target network 10. More specifically, the program 223 extracts a point that is different from the present situation to each coupled point of the network design information (such as a port ID and a cable ID of an uncoupled point for a point that is supposed to be coupled and of a coupled point for a point that is supposed to be uncoupled for the network design information) for instance.

In the step S2003, the program 223 creates or updates the work list table 231. More specifically, the program 223 creates or updates a work table 71 for a point in which the network design information that has been extracted in the step S2002 and the present situation are different from each other for instance. For a creation or an update of the work table 71, a work ID 711 is added to each work, a port ID and a cable ID of a point that is different from the present situation are corresponded as a work target ID 713 for every work ID 711, and a work type ID 712 is corresponded based on a work type table 72. The work can also include a work for coupling the network cable 12a to a port of the network apparatus 11 and a work for releasing the coupling of the network cable 12a to a port of the network apparatus 11 (a work for uncoupling the network cable 12a from the port).

By the above described steps, in the case in which the management target network 10 is constructed, a work that is supposed to be executed as the situation now stands can be managed for every work. Moreover, in the case in which the above described program 223 is executed in a constant manner, the latest information of a work that is supposed to be executed can be managed.

Figure 21:
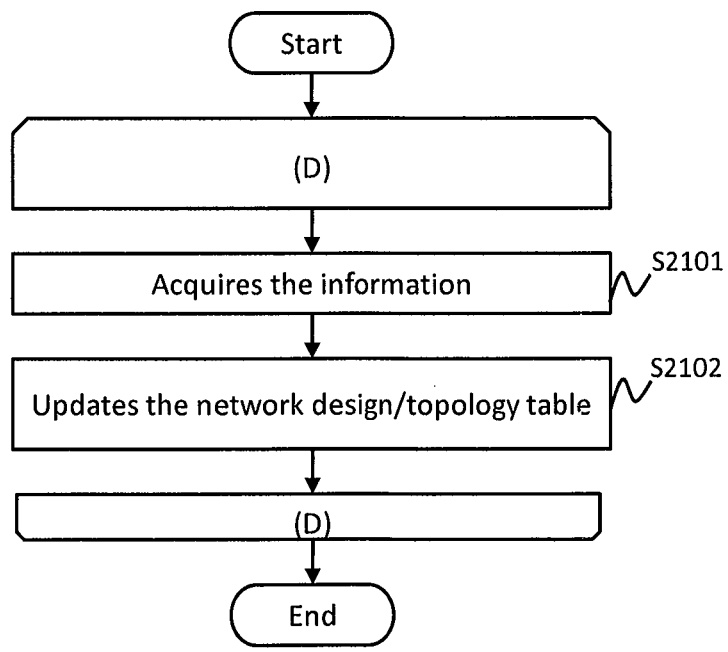
FIG. 21 is a flowchart of a network/topology information acquisition processing.

FIG. 21 is a flowchart of a network/topology information acquisition table.

The network/topology information acquisition processing is a processing that is executed by the network topology information acquisition 225. The processing is executed in the case in which the network management apparatus 2 is coupled to the management target network 10, and can also be executed in every update of the management target network 10 (or on a regular basis) after that.

The program 225 executes the processing to all network apparatuses 11 of the management target network 10. In the following, one network apparatus 11 will be described as an example. The network apparatus 11 is referred to as a "target network apparatus 11" in the descriptions of FIG. 21.

In the step S2101, the program 225 acquires the information from the target network apparatus 11. The information that is acquired is the information that is registered to the node table 61 and the network port table 62 for instance. More specifically, the information that is acquired is a node name, a type, a model ID, a port number, and a status (whether or not the target network apparatus 11 can be communicated with for instance) for the target network apparatus 11 for instance.

In the step S2102, the program 225 registers the information that has been acquired to the tables 61 and 62 and updates the statuses 615 and 624 of the network design/topology table 231.

By the above described steps, the current configuration and a status of each network apparatus 11 that are related to the management target network 10 can be comprehended.

Figure 11:
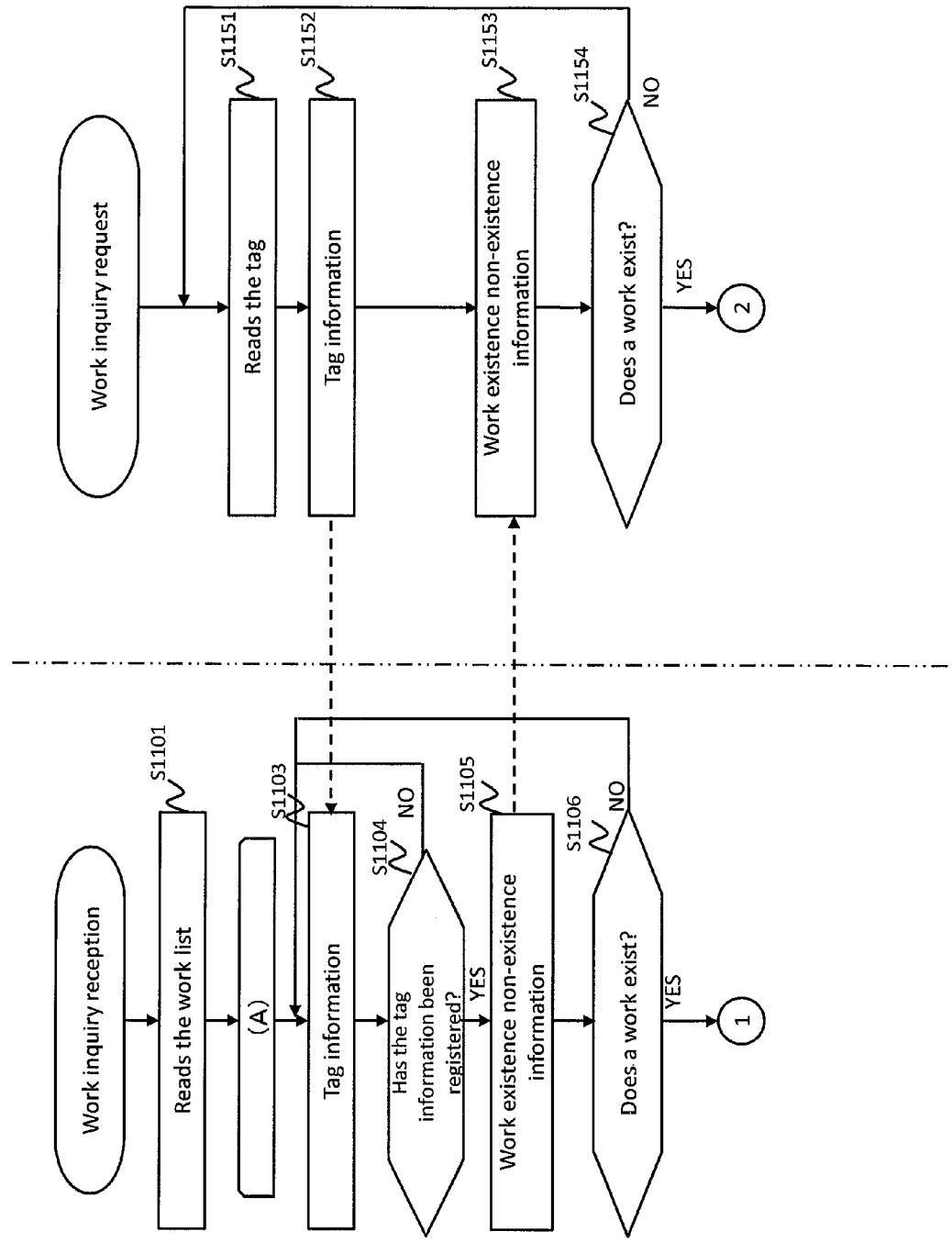
FIG. 11 is a part of a flowchart of a work inquiry processing.
Figure 12:
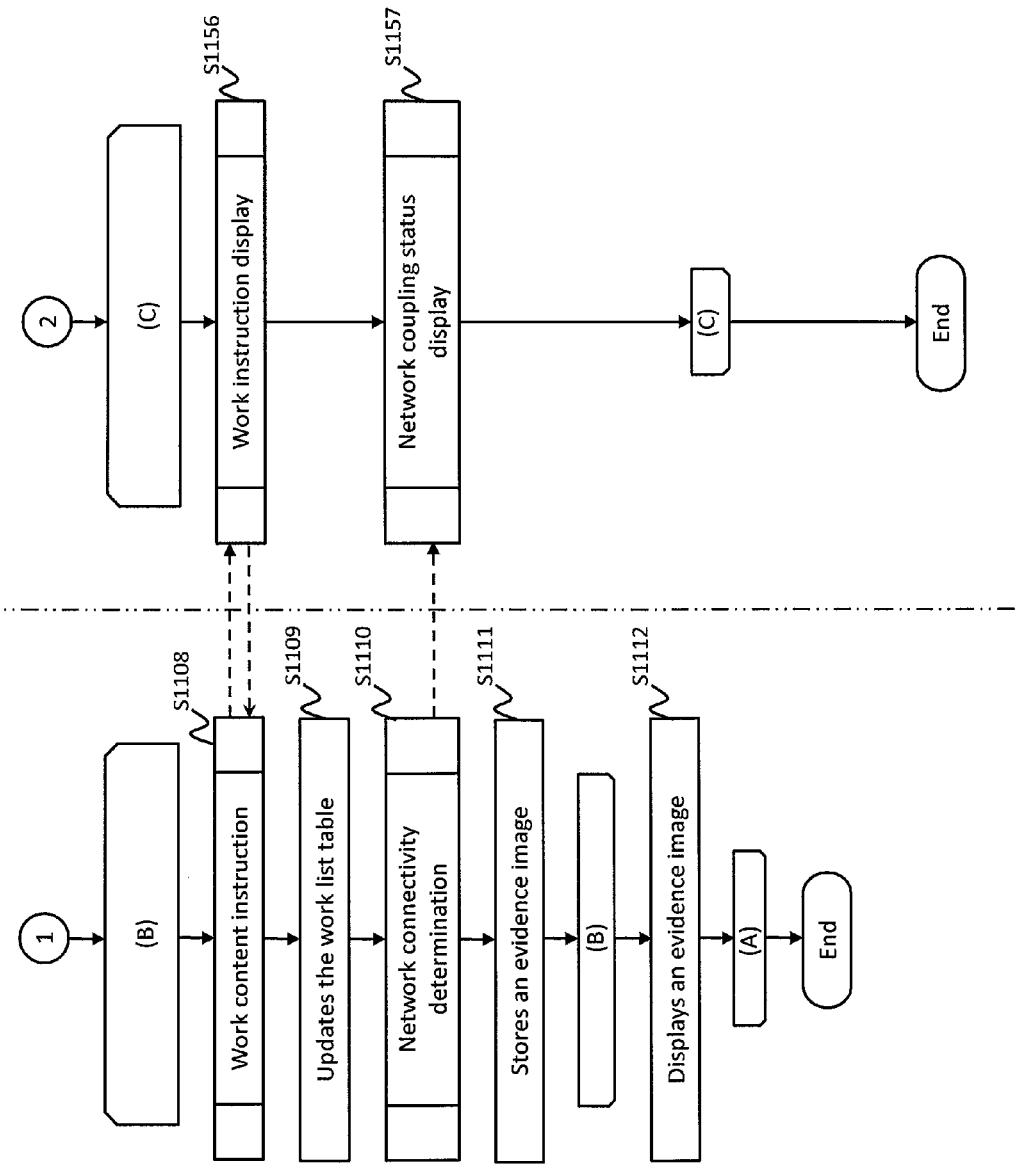
FIG. 12 is a remainder of a flowchart of a work inquiry processing.

FIG. 11 is a part of a flowchart of a work inquiry processing. FIG. 12 is a remainder of a flowchart of a work inquiry processing.

The work inquiry processing is a processing that is carried out in the case in which the augmented reality presenting apparatus 4 executes the work inquiry request program 421 and the network management apparatus 2 executes the work inquiry reception program 221.

In the following, a flowchart of the work inquiry reception program 221 will be described in the first place, and a flowchart of the work inquiry request program 421 will be described in the next place.

In the step S1101, the program 221 reads the work list table 231 to a cache that is not shown.

In the next place, the program 221 can repeat the steps S1103 to S1112 until the network management apparatus 2 is stopped.

In the step S1103, the program 221 receives the tag information (hereafter referred to as at least any one of a tag pattern and a tag ID in the present embodiment) of the network apparatus 11 (hereafter referred to as a "target network apparatus 11" in the descriptions of FIG. 11, FIG. 12, and a figure for illustrating a processing that is included in a step of FIGS. 11 and 12) from the augmented reality presenting apparatus 4. In the case in which an image of a tag is received from the augmented reality presenting apparatus 4, the program 221 can extract the tag information from the image of a tag.

The program 221 determines whether or not the tag information that has been received has been registered to the network apparatus tag table 232 (S1104). In the case in which the result of the determination is false (No in the step S1104), the program 221 returns the processing to the step S1103. On the other hand, in the case in which the result of the determination is true (Yes in the step S1104), the program 221 acquires a node ID 83 that is corresponded to the tag information and goes ahead with the processing to the step S1105.

In the step S1105, the program 221 transmits the work existence non-existence information that indicates whether or not a work exists in the network apparatus 11 (that is, the target network apparatus 11) that is corresponded to the node ID 83 that has been acquired to the augmented reality presenting apparatus 4. More specifically, the program 221 acquires all port IDs 621 that are corresponded to the node ID 622 that has been acquired from the network port table 62 for instance. Moreover, the program 221 extracts a work in which the acquired port ID is a work target ID 713 and the status 716 is "unexecuted" from the work table 71. The program 221 then transmits the work existence non-existence information to the augmented reality presenting apparatus 4.

In the step S1106, the program 221 determines whether or not a work exists for the target network apparatus 11. More specifically, the determination is carried out based on whether or not a work has been extracted in the step S1105. In the case in which the result of the determination is true (Yes in the step S1106), the program 221 goes ahead with the processing to the step S1107. On the other hand, in the case in which the result of the determination is false (No in the step S1106), the program 221 returns the processing to the step S1103.

The program 221 executes the steps S1108 to S1111 for every work until all works for the target network apparatus 11 are completed. In the following, one work will be described as an example. The work is referred to as a "target work" in the descriptions of FIG. 11, FIG. 12, and a figure that is corresponded to a step in FIGS. 11 and 12.

In the step S1108, the program 221 executes the work content instruction program 224. The work content instruction program 224 will be described later (see FIG. 14 and FIG. 15). In this step, the program 224 transmits the guide information that includes the information that indicates the work contents to the augmented reality presenting apparatus 4. Moreover, the program 224 receives an evidence image before a target work and an evidence image after a target work from the augmented reality presenting apparatus 4. In addition, in the case in which a target work is completed, a work completion response can also be notified of from the augmented reality presenting apparatus 4.

In the step S1109, the program 221 updates the work table 71. More specifically, the program 221 updates a status 716 that is corresponded to a target work to be "executed".

In the step S1110, the program 221 executes the network connectivity determination program 222. The network connectivity determination program 222 will be described later (see FIG. 16).

Figure 16:
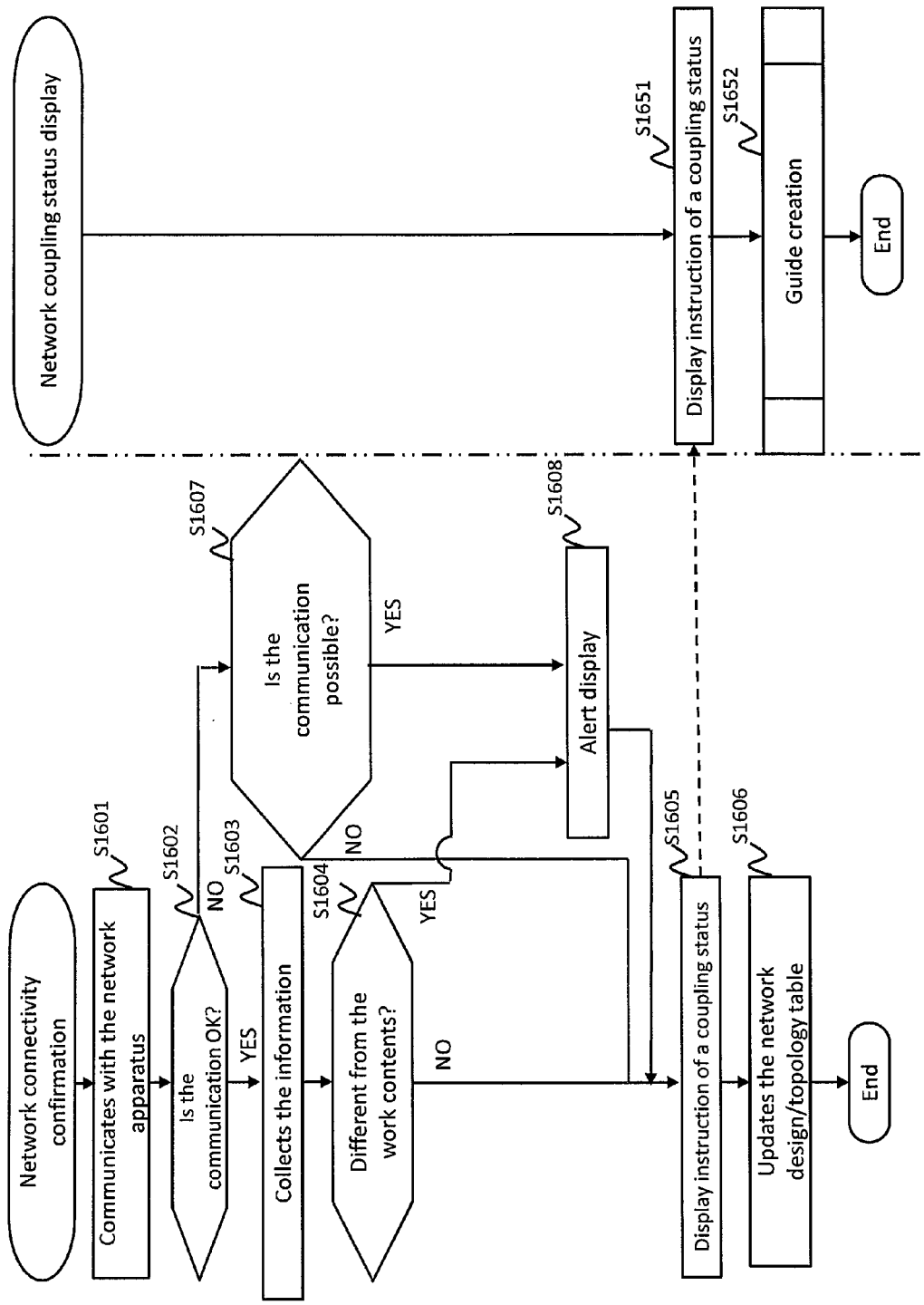
FIG. 16 is a flowchart of a network connectivity confirmation processing.

In the step S1111, in the case in which the work contents that are equivalent to the work contents that are indicated by the work list table 234 for a work target are executed for the work target and a coupling status is correct for the work target (in the case in which a network connectivity confirmation of FIG. 16 is completed without executing the step S1608 of FIG. 16), the program 221 stores an evidence image before a target work and an evidence image after a target work that have been received in the step S1108 and have been stored into the memory 22 (the program 221 stores the images into the auxiliary storage device 23). In the other cases, the program 221 can also erase an evidence image before a target work and an evidence image after a target work that have been received in the step S1108 and have been stored into the memory 22 from the memory 22.

In the step S1112, the program 221 displays an evidence image before a target work and an evidence image after a target work to the web client apparatus 3. More specifically, the program 221 responds to a request from the web client apparatus 3 and transmits an evidence image before a target work and an evidence image after a target work as the display information to the web client apparatus 3.

In the next place, a flow of the work inquiry request program 421 will be described.

In the step S1151, the program 421 reads the tag information that of the network apparatus 11. More specifically, the program 421 extracts the tag information from an input image that has been input to the augmented reality presenting apparatus 4 by an operation of a worker (an input image in which a visible object on a tag of the target network apparatus 11 is shown) for instance.

In the step S1152, the program 421 transmits the tag information that has been extracted to the network management apparatus 2. An object that is transmitted is not restricted to the tag information. For instance, the program 421 can also transmit a shot image of a tag as substitute for or in addition to the tag information. In this case, the network management apparatus 2 can receive a tag shot image and can extract the tag information from the tag shot image.

In the step S1153, the program 421 receives the work existence non-existence information from the network management apparatus 2.

In the step S1154, the program 421 determines whether or not a work exists for the target network apparatus 11. More specifically, the determination is carried out based on whether or not a work has been extracted in the step S1153. In the case in which the result of the determination is true (Yes in the step S1154), the program 421 goes ahead with the processing to the step S1155. On the other hand, in the case in which the result of the determination is false (No in the step S1154), the program 421 returns the processing to the step S1151.

The program 421 executes the steps S1156 and S1157 for every work until all works for the target network apparatus 11 are completed.

In the step S1156, the program 421 executes the work instruction display program 424. The work instruction display program 424 will be described later (see FIG. 14 and FIG. 15).

In the step S1157, the program 421 executes the network coupling status display program 423. The network coupling status display program 423 will be described later (see FIG. 16).

By the above described processing, the information that indicates the contents of a necessary target work is extracted for the target network apparatus 11. Moreover, a guide based on the guide information that includes the information that indicates the work contents can be associated with an input image and displayed through the augmented reality presenting apparatus 4. By this configuration, a worker can carry out a work in an appropriate manner and in a smooth way.

Moreover, an image of a work target of a target work is shot by the augmented reality presenting apparatus 4 before the target work and after the target work, and the shot image is transmitted to the network management apparatus 2 as an evidence image and is stored. By this configuration, an accuracy of a determination of whether a work has been carried out or not can be improved.

Moreover, an evidence image before a target work and an evidence image after a target work are stored after a network connectivity determination, that is, after a coupling status is confirmed. In other words, in the case in which a work fails, a shot image can be prevented from being stored as an evidence image. By this configuration, an accuracy of a determination of whether a work has been carried out or not can be improved furthermore.

Figure 13:
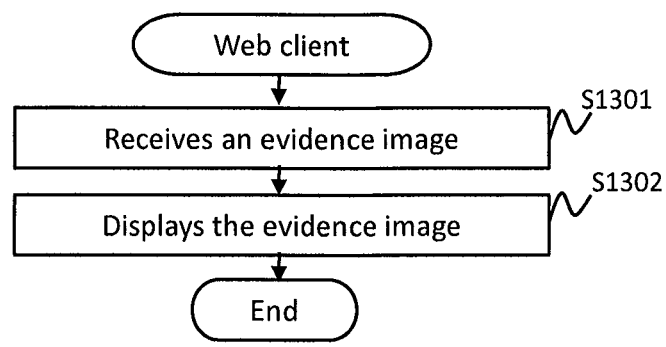
FIG. 13 is a flowchart of a web client processing.

FIG. 13 is a flowchart of a web client processing.

The web client processing is executed by a web console 321 of the web client apparatus 3.

In the step S1301, the web console 321 receives an evidence image that has been transmitted from the network management apparatus 2 (such as a set of an evidence image before a target work and an evidence image after a target work) as the display information.

In the step S1302, the web console 3 displays the received evidence image to the display device 35. A manager can judge whether or not a work has been carried out, for instance, whether or not a cable has been coupled to the network apparatus 11 in a proper manner from the evidence image that has been displayed.

Figure 14:
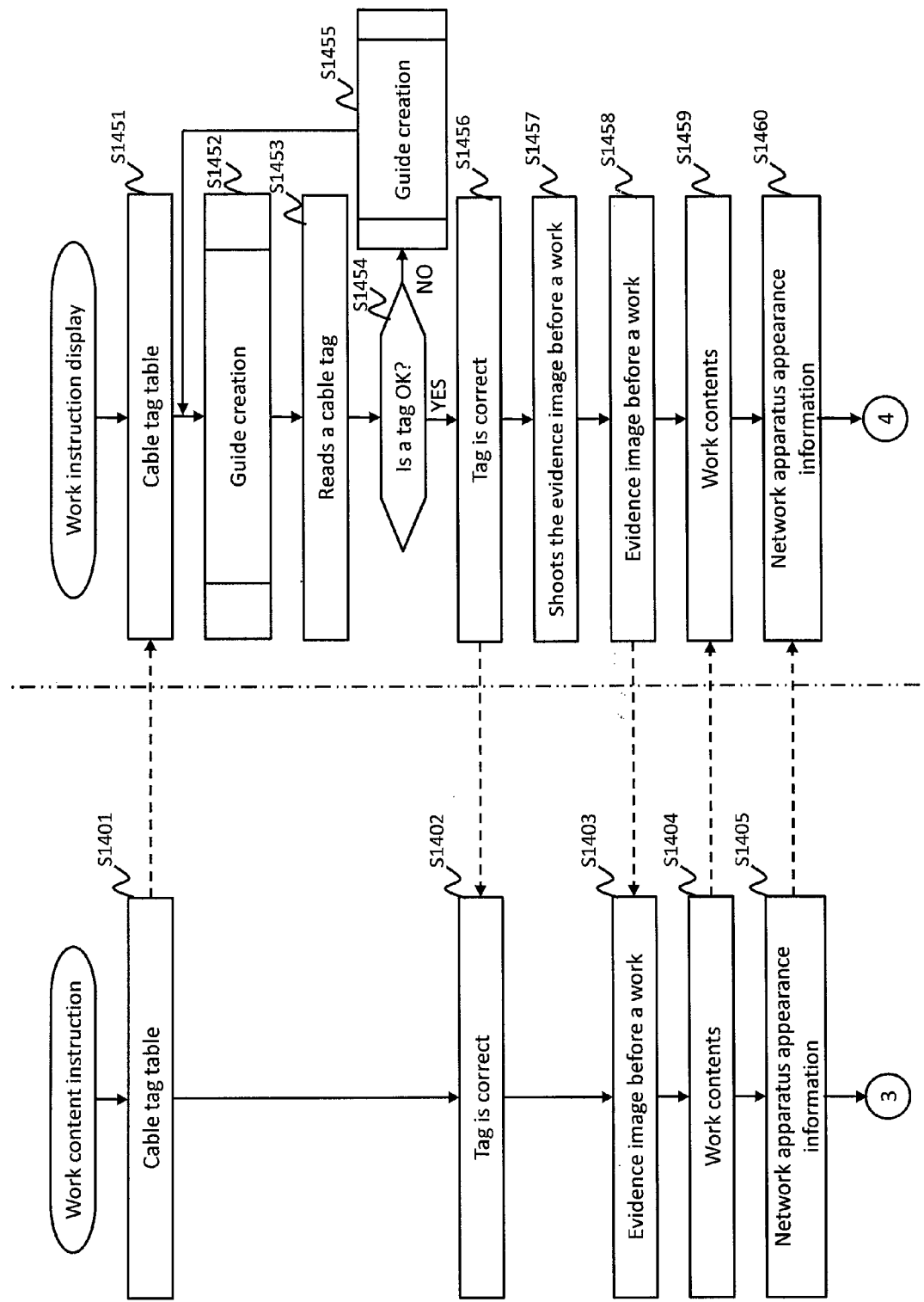
FIG. 14 is a flowchart of a work content instruction processing.
Figure 15:
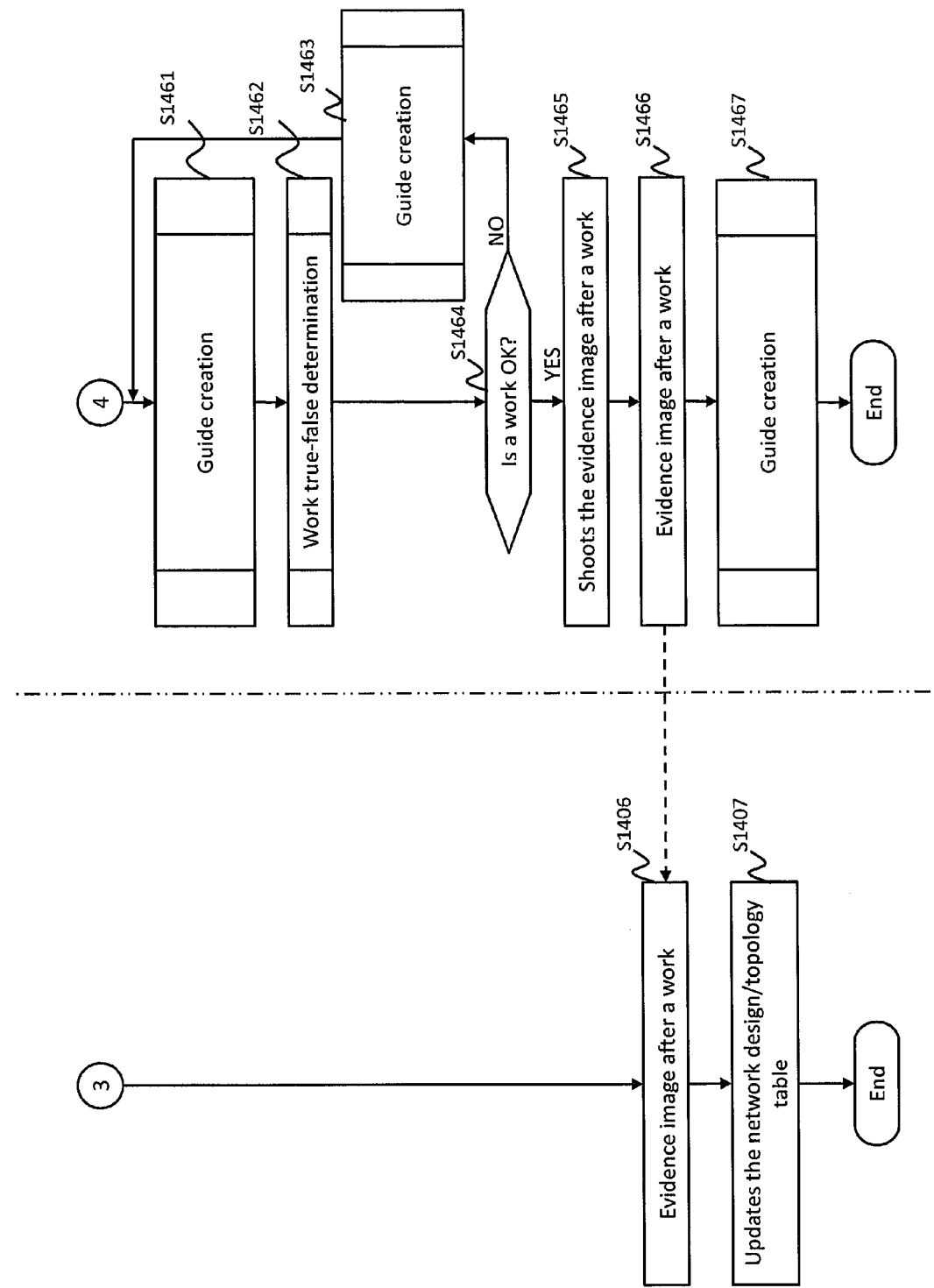
FIG. 15 is a remainder of a flowchart of a work content instruction processing.

FIG. 14 is a flowchart of a work content instruction processing. FIG. 15 is a remainder of a flowchart of a work content instruction processing.

The work content instruction processing is a processing that is carried out in the case in which the augmented reality presenting apparatus 4 executes the work instruction display program 424 (see the step S1156 of FIG. 12) and the network management apparatus 2 executes the work content instruction program 224 (see the step S1108 of FIG. 12).

In the following, a flowchart of the work instruction display program 424 will be described in the first place, and a flowchart of the work content instruction program 224 will be described in the next place.

In the step S1451, the program 424 receives the information of a cable tag table 1401 and stores the information into the memory 42. The information that is received can also be a part of the information that is included in the cable tag table 1401.

In the step S1452, the program 424 executes the guide creation program 425. The details of the guide creation program 425 will be described later (see FIG. 19). By this processing, a guide (such as a shooting instruction of a tag of a network cable 12a) is overlay-displayed to an input image that is displayed on the display device 44 (an image in which a network cable 12a is shown).

In the step S1453, the program 424 reads the tag information from a tag that is shown in an input image (a tag of the network cable 12a).

In the step S1454, the program 424 determines whether or not the tag information that has been read is correct. More specifically, the program 424 determines whether or not the tag information that has been read conforms to a tag ID 91 or a tag pattern 92 of a cable tag table 235 for instance.

In the case in which the result of the determination is true (Yes in the step S1154), the program 424 goes ahead with the processing to the step S1456. On the other hand, in the case in which the result of the determination is false (No in the step S1154), the program 424 executes the guide creation program 425 (see FIG. 19) in the step S1455 and returns the processing to the step S1452. By the processing of the step S1455, a guide (such as the highlighted range of a message that indicates that a network cable 12*a* is incorrect and of the tag thereof) is overlay-displayed to an input image that is displayed on the display device 44 (an image in which a network cable 12*a* is shown).

In the step S1456, the program 424 transmits the information that indicates that the tag information is correct to the network management apparatus 2.

In the step S1457, the program 424 shoots the work target before a target work as an evidence image. More specifically, the program 424 can store an input image as a shot image in the case in which the result of the determination of the step S1154 is true for instance. The shot image is an evidence image before a target work. In the case in which the result of the determination of the step S1154 is true, the program 424 can overlay-display a shooting operation instruction as a guide to an input image that is displayed on the display device 44. In addition, in the case in which the program 424 receives a shooting instruction from a worker in response to the shooting operation instruction, the program 424 can store the input image as a shot image. Or more specifically, in the case in which the result of the determination of the step S1154 is true, the program 424 can store the input image as a shot image without receiving a shooting instruction from a worker.

In the step S1458, the program 424 transmits an evidence image before a target work to the network management apparatus 2. The step S1458 can also be omitted, and an evidence image before a target work can also be transmitted together with an evidence image after a target work in the step S1466.

In the step S1459, the program 424 receives the guide information that includes the information that indicates the work contents of a target work from the network management apparatus 2. The work contents described above are the information of at least any one of a work ID 711, a work type ID 712, a work target ID 713, a guide message 722 that is associated with the work type ID 721, a port ID 621 that is equivalent to the work target ID 713, a cable ID 631 and a node ID 622 (611) that are associated with a port number 1 (632) or a port number 2 (633), and a model ID 614 that is associated with the node ID 611 for instance (see the work list table 234 and the network design/topology table 231). Moreover, the work contents can also include a port location ID 1021 and a lamp location ID 1031 that are corresponded to the model IDs 1022 and 1032 and the port numbers 1023 and 1033 (see the port location table 102 and the access lamp location table 103).

In the step S1460, the program 424 receives the information of the network apparatus appearance information table 233 from the network management apparatus 2 and stores the information into the memory 42. The information that is received can also be a part of the information that is included in the network apparatus appearance information table 233.

Figure 19:
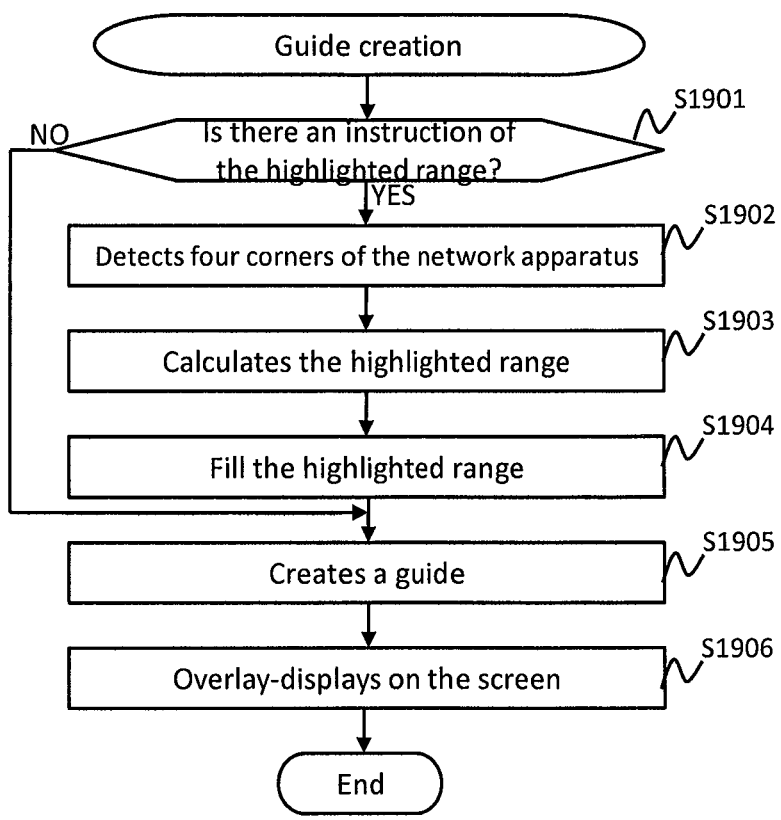
FIG. 19 is a flowchart of a guide creation processing.

In the step S1461, the program 424 executes the guide creation program 425 (see FIG. 19). By this processing, a guide based on the guide information that has been received in the step S1459 (such as the highlighted range of a message that indicates that the work contents and of the port location thereof) is overlay-displayed to an input image that is displayed on the display device 44 (an image in which the network apparatus 11 or a network cable 12*a* is shown).

In the step S1462, the program 424 executes the work true-false determination program 422 and creates a flag (a success flag) that indicates whether or not a target work is correct (that is, a target work is succeeded). For instance, a success flag is set to be "True" in the case in which a target work is correct, and a success flag is set to be "False" in the case in which a target work is not correct. The details of the work true-false determination program 422 will be described later (see FIG. 18).

In the step S1464, the program 424 confirms the flag that has been created by the work true-false determination program 422 and determines whether or not a target work is correct. In the case in which the result of the determination is true (Yes in the step S1464), the program 424 goes ahead with the processing to the step S1465. On the other hand, in the case in which the result of the determination is false (No in the step S1464), the program 424 executes the guide creation program 425 (see FIG. 19) and returns the processing to the step S1461. By the processing of the step S1463, a guide (such as the highlighted range of a message that indicates that the work is canceled out and of the port location thereof) is overlay-displayed to an input image that is displayed on the display device 44 (an image in which a network cable 12*a* is shown).

In the step S1465, the program 424 the work target after a target work is shot as an evidence image. More specifically, the program 424 can store an input image as a shot image in the case in which the result of the determination of the step S1464 is true for instance. The shot image is an evidence image after a target work. In the case in which the result of the determination of the step S1464 is true, the program 424 can overlay-display a shooting operation instruction as a guide to an input image that is displayed on the display device 44. In addition, in the case in which the program 424 receives a shooting instruction from a worker in response to the shooting operation instruction, the program 424 can store the input image as a shot image. Or more specifically, in the case in which the result of the determination of the step S1464 is true, the program 424 can store the input image as a shot image without receiving a shooting instruction from a worker.

In the step S1466, the program 424 transmits an evidence image after a target work to the network management apparatus 2.

In the step S1467, the program 424 executes the guide creation program 425 (see FIG. 19). By the processing of the step S1467, a guide (such as the highlighted range of a message that indicates that the work is correct and of the tag part thereof) is overlay-displayed to an input image that is displayed on the display device 44 (an image in which the network apparatus 11 or a network cable 12*a* is shown).

In the next place, a flow of the work content instruction program 224 will be described.

In the step S1401, the program 224 transmits the information that is included in a cable tag table 235 to the augmented reality presenting apparatus 4. The information that is transmitted can be all information of the cable tag table 235 and can also be the partial information such as only information for a target work for instance.

In the step S1402, the program 224 receives the information that indicates that a tag is correct from the augmented reality presenting apparatus 4.

In the step S1403, the program 224 receives an evidence image before a target work from the augmented reality presenting apparatus 4.

In the step S1404, the program 224 transmits the guide information that includes the information that indicates the work contents of a target work to the augmented reality presenting apparatus 4.

In the step S1405, the program 224 transmits the information of the network apparatus appearance information table 233 to the augmented reality presenting apparatus 4. The information that is transmitted can be all information of the network apparatus appearance information table 233 and can also be the partial information for instance.

In the step S1406, the program 224 receives an evidence image after a target work from the augmented reality presenting apparatus 4.

In the step S1407, the program 224 updates a status 624 of a network port table 62. Moreover as may be necessary, the program 224 updates a port number 1 status or a port number 2 status 636 of a cable table 63.

In FIG. 14 and FIG. 15, in the case in which the network management apparatus 2 transmits the guide information that includes the information that indicates the work contents of a target work, a guide (work contents) is displayed on the augmented reality presenting apparatus 4, whereby a worker can carry out a target work smoothly.

In FIG. 14 and FIG. 15 moreover, a shot image of a target work is shot as an evidence image before a target work in the case in which it is determined that a target work is correct (Yes in the step S1454), and a shot image of a target work is shot as an evidence image before a target work in the case in which it is determined that a target work is succeeded (correct) (Yes in the step S1464). In other words, an input image can be acquired as a shot image at an appropriate timing before a target work and after a target work.

FIG. 16 is a flowchart of a network connectivity confirmation processing.

The network connectivity confirmation processing is a processing that is carried out in the case in which the augmented reality presenting apparatus 4 executes the network coupling status display program 423 (see the step S1157 of FIG. 12) and the network management apparatus 2 executes the network connectivity determination program 222 (see the step S1110 of FIG. 12).

In the following, a flowchart of the network connectivity determination program 222 will be described in the first place, and a flowchart of the network coupling status display program 423 will be described in the next place.

In the case in which the network connectivity determination program 222 is executed, the work contents that have been described before is input to the program 222 as an argument.

In the step S1601, the program 222 checks whether or not the network management apparatus 2 can communicate with the target network apparatus 11.

In the step S1602, the program 222 checks whether or not the target network apparatus 11 can be communicated with. In the case in which the result of the determination is true (Yes in the step S1602), the program 222 goes ahead with the processing to the step S1603. On the other hand, in the case in which the result of the determination is false (No in the step S1602), the program 222 goes ahead with the processing to the step S1607.

In the step S1607, the program 222 checks whether or not the network apparatus 11 that has been coupled to the target network apparatus 11 via the network cables 12a (hereafter referred to as a coupled destination network apparatus 11 in the descriptions) can be communicated with. More specifically, the program 222 acquires a port number 1 (632) or a port number 2 (633) that are corresponded to a port of the target network apparatus 11 from the network design/topology table 231, and determines whether or not a status 615 of the network apparatus (the coupled destination network apparatus) 11 that is provided with a node ID 622 (611) that is associated with the port ID 621 "can be communicated with".

In the case in which the result of the determination is true (No in the step S1607), the program 222 goes ahead with the processing to the step S1605. On the other hand, in the case in which the result of the determination is false (Yes in the step S1607), the program 222 transmits the alert display information to the web client apparatus 3 (S1608) and goes ahead with the processing to the step S1605. In addition to the alert display information, the program 222 can also transmit a node name 613 (or a node ID 611) of the target network apparatus 11 of the work list table 231, the work contents, and a kind of an abnormality that has occurred (abnormality contents) for instance.

In the step S1603, the program 222 collects the information of the target network apparatus 11. The information that is to be collected is a node ID, a type (a model), a node name, a model ID or the like of the target network apparatus 11 for instance. Moreover, the information that is to be collected can also be a port ID of a port to which the network cable 12a has been coupled and a cable ID of the network cable 12a that is coupled for instance.

In the step S1604, the program 222 determines whether or not the information that has been collected in the step S1603 is different from the work contents of a target work. More specifically, the program 222 determines whether or not the information that has been collected in the step S1603 contradicts a node ID, a model ID, a cable ID and so on that are included in the work contents that have been transmitted to the augmented reality presenting apparatus 4 in the step S1459 for instance. In the case in which they are correct, in addition, the program 222 determines whether or not a cable has been coupled to the LAN port 115 that is a work target of the target network apparatus 11.

In the case in which the result of the determination is true (Yes in the step S1604), the program 222 transmits the alert display information to the web client apparatus 3 (S1608) and goes ahead with the processing to the step S1605. On the other hand, in the case in which the result of the determination is false (No in the step S1604), the program 222 goes ahead with the processing to the step S1605.

In the step S1605, the program 222 transmits the guide information that includes the display instruction of a coupling status of the target network apparatus to the augmented reality presenting apparatus 4.

In the step S1606, the program 222 updates the network design/topology table 231 table. More specifically, the program 222 updates a status 615 of a node table 61, a status 624 of a network port table 62, and a port number 1 status or a port number 2 status 636 of a cable table 63 in accordance with a communication status and a coupling status of the network management apparatus 2.

In the next place, a flow of the network coupling status display program 423 will be described.

In the step S1651, the program 423 receives the guide information that includes the display instruction of a coupling status of the target network apparatus 11 from the network management apparatus 2.

In the step S1651, the program 423 executes the guide creation program 425 based on the display instruction in the guide information (see FIG. 19).

By the above described processing, a manager can easily confirm whether or not the network apparatus 11 of the target can be communicated with by the work, that is, whether or not an appropriate work to the instruction has been carried out. In the case in which the network apparatus 11 of the target cannot be communicated with, a manager can confirm where the casus exists. Moreover, a guide of a coupling status can be displayed as the additional information to the network apparatus 11 of the target via the augmented reality presenting apparatus 4. By this configuration, a work burden of a worker can be reduced.

Figures 17A, 17B:
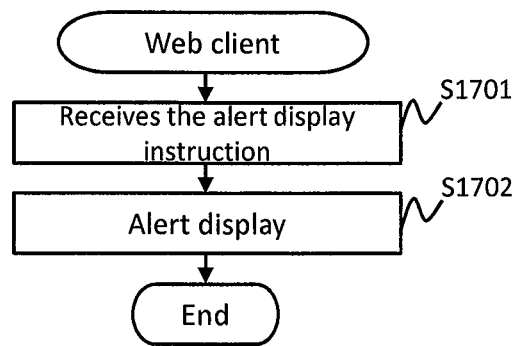
FIG. 17A is a flowchart of a web client processing.
FIG. 17B is a view showing an example of an alert instruction.

FIG. 17A is a flowchart of a web client processing. FIG. 17B is a view showing an example of an alert instruction.

The web client processing is executed by the web console 321 in accordance with an alert display instruction (see the step S1608 of FIG. 16) from the network management apparatus 2.

In the step S1701, the web console 321 receives the alert display information that has been transmitted from the network management apparatus 2 and stores the alert display information into a memory that is not shown. The alert display information is a node name of the target network apparatus 11, a kind of a work (the work contents), and a kind of an abnormality that has occurred (the abnormality contents) to the work for instance.

In the step S1702, the web console 321 displays an alert screen based on the alert display information to the display device 35. More specifically, an alert can include a node name of the network apparatus 11 of the work target, the work contents (for the "work target ID" and the "cable ID", an ID that is corresponded respectively is displayed in a practical sense), and the abnormality contents for instance as shown in FIG. 17B. Moreover, the alert screen can display an "image display" button that is linked to an evidence image that has been stored in the memory 22 by the network management apparatus 2. In the case in which the button is pressed, the web console 321 can request an evidence image that is linked to the button to the network management apparatus 2, and can receive the evidence image from the network management apparatus 2 in response to the request and display the evidence image. The evidence image can also be displayed on the alert screen in advance.

By the above described configuration, a manager can confirm the contents of an alert. More specifically, a worker can have a visual contact with the contents of an alert together with the evidence image.

FIG. 19 is a flowchart of a guide creation processing.

The guide creation processing is carried out by the guide creation program 425 of the augmented reality presenting apparatus 4 (see the steps S1451 and S1455 of FIG. 14, the steps S1461, S1463, and S1467 of FIG. 15, and the step S1652 of FIG. 16).

In the case in which the guide creation program 425 is executed, the work contents in the guide information is input to the program 425 as an argument. Moreover, in the case in which an instruction of a display of the highlighted range is included in the guide information, the instruction is also input to the program 425 as an argument. Together with the instruction of a display of the highlighted range, a work target ID (a port location ID) and a cable ID can also be input.

In the step S1901, the program 425 checks whether or not there is an instruction of a display of the highlighted range as an argument. In the case in which the result of the determination is true (Yes in the step S1901), the program 425 goes ahead with the processing to the step S1902. On the other hand, in the case in which the result of the determination is false (No in the step S1901), the program 425 goes ahead with the processing to the step S1905.

In the step S1902, the program 425 detects four corners of the network apparatus 11. More specifically, for the augmented reality presenting apparatus 4, the CPU 41 displays an input image that has been input through the video camera 46 and that has been stored into the memory 42 (an input image in which the image has been adjusted as may be necessary) on the display device 44 in a shooting mode (a shooting mode of a moving image or a still image). A worker adjusts a comparative location of the augmented reality presenting apparatus 4 and the network apparatus 11 in such a manner that all areas of a face 11a (a front face of the network apparatus 11) that includes the LAN port 115 is included in the display device 44. The program 425 analyzes an input image in which a range that includes all areas of a face 11a that includes the LAN port 115 is shown, thereby detecting four corners of a face 11a that includes the LAN port 115. In the case in which a tag is added to at least one of four corners of a face 11a that includes the LAN port 115 (preferably all of four corners), a degree of accuracy of a detection of the four corners of a face 11a that includes the LAN port 115 (that is, a range of a face 11a that includes the LAN port 115) can be improved.

In the step S1903, the program 425 calculates the highlighted range based on the instruction of a display of the highlighted range. More specifically, the program 425 calculates a port location from the X-coordinate view point 1024, the X-coordinate ending point 1025, the Y-coordinate view point 1026, and the Y-coordinate ending point 1027 for the port location ID 1025 for instance.

In the step S1904, the program 425 creates an image in such a manner that the highlighted range is filled and overlay-displays the highlighted range (the image) to an input image that is displayed on the display device 44. In the case in which the highlighted range is filled, a LAN port that is a work target may become invisible, and a work target can be seen through the highlighted range that is provided with a transparency.

In the step S1905, the program 425 creates a guide based on the work contents. The guide is created based on a guide message of the work contents, a work target ID, and a cable ID.

In the step S1906, the program 425 displays the guide that has been created on the display device 44.

Figure 24A:
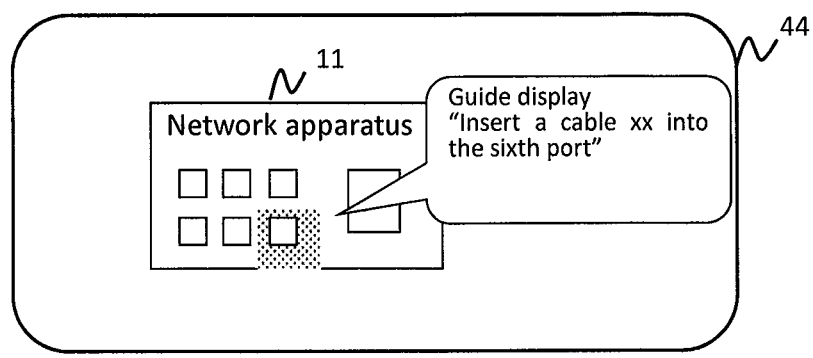
FIG. 24A is a view for illustrating an instruction of an augmented reality apparatus before a work.
Figure 24B:
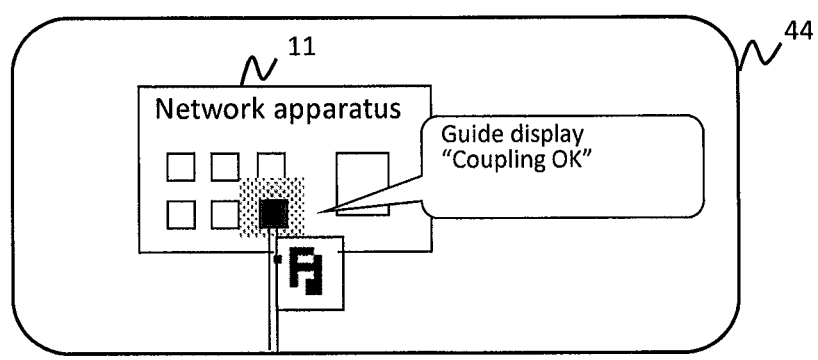
FIG. 24B is a view for illustrating an instruction of an augmented reality apparatus after a work.

By the above configuration, a location of a LAN port that is a work target is overlay-displayed on the display device 44 of the augmented reality presenting apparatus 4 as the highlighted range in conjunction with the location information, and a guide is also overlay-displayed. Consequently, a user-friendliness and an accuracy of a work of a worker can be improved. FIG. 24A is a view for illustrating an example of the display device 44 of an augmented reality apparatus before a work. In this example, the highlighted range that includes a range of the LAN port 115 is displayed, and a message that is conducive to coupling such as "Insert a cable xxx into the x-th port" is displayed as a guide. FIG. 24B is a view for illustrating an example of the display device 44 of an augmented reality apparatus after a work. In this example, the highlighted range that includes a range of the LAN port 115 is displayed, and a message for a coupling confirmation such as "Coupling OK" is displayed as a guide.

Figure 18:
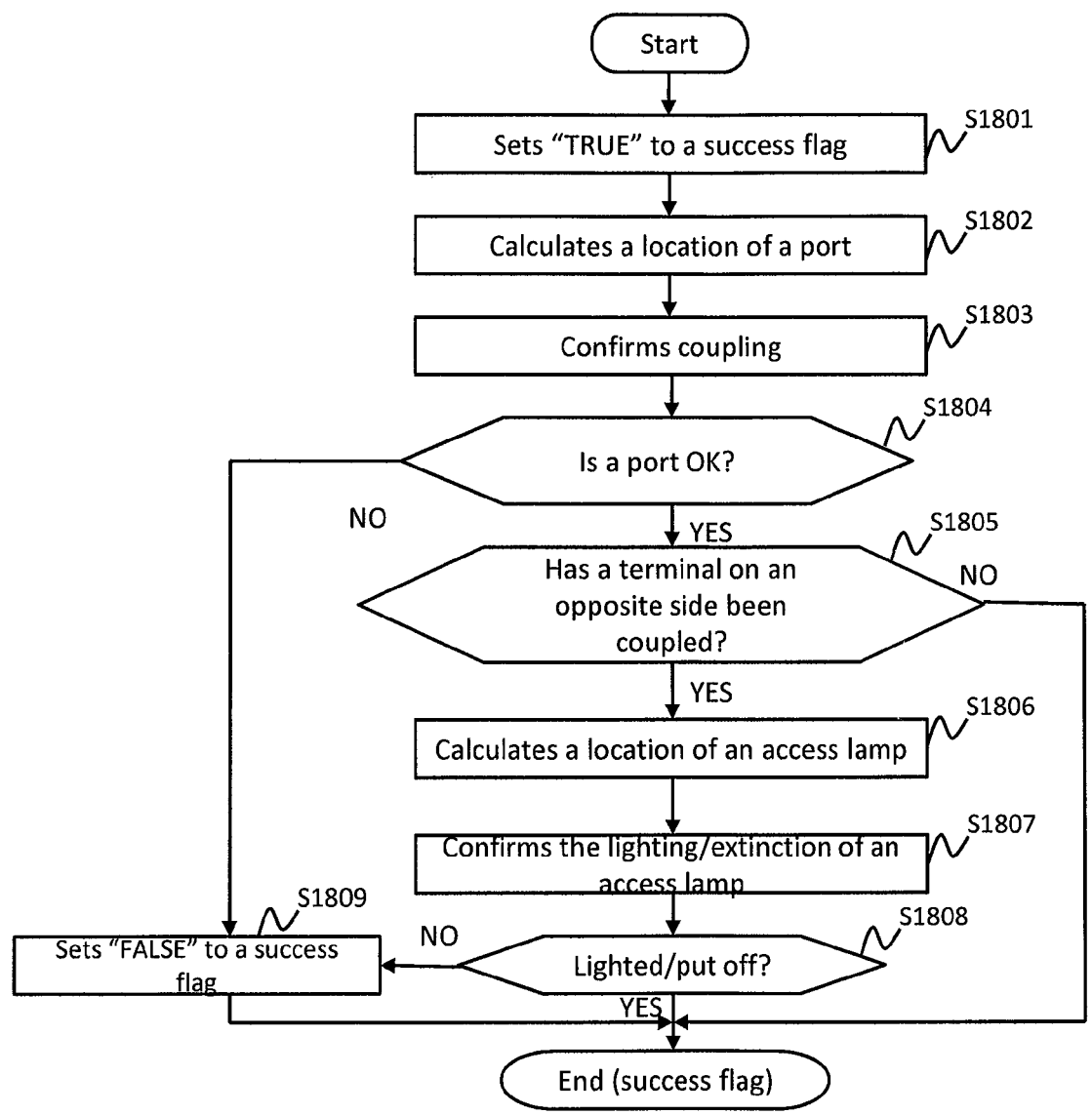
FIG. 18 is a flowchart of a work true-false determination processing.

FIG. 18 is a flowchart of a work true-false determination processing. The work true-false determination processing is carried out in the case in which the CPU 41 of the augmented reality presenting apparatus 4 executes the work true-false determination program 422 (see the step S1462 of FIG. 15).

In the step S1801, the program 422 sets "True" to a success flag.

In the step S1802, the program 422 calculates a location of a LAN port 115 in which a work has been carried out (hereafter referred to as a target port in the descriptions) from an image that has been recognized (an input image). More specifically, the program 422 calculates a location of a target port for the face 11a that has been recognized based on the horizontal and vertical size of a range of the face 11a of the target network apparatus 11 that has been recognized, the horizontal and vertical size of each LAN port 115, and the location information of each LAN port 115 that has been recorded in the network instrument appearance information table 233 for instance.

In the step S1803, the program 422 determines whether or not a cable has been coupled to a target port. More specifically, the program 422 determines whether or not a cable has been coupled to the LAN port 115 that has been calculated in the step S1802.

In the step S1804, the program 422 determines whether or not a target port is correct. More specifically, the program 422 determines whether or not the LAN port 115 that has been calculated in the step S1802 and a location that is corresponded to a port location ID that is included in the work contents conform to each other. In the case in which the result of the determination is true (Yes in the step S1804), the program 422 goes ahead with the processing to the step S1805. On the other hand, in the case in which the result of the determination is false (No in the step S1804), the program 422 sets "False" to a success flag (S1809) and terminates the processing.

In the step S1805, the program 422 determines whether or not a terminal on an opposite side of the network cable 12a has been coupled to a target port. More specifically, the program 422 determines whether or not a terminal on an opposite side of the network cable 12a that has been coupled to a target port has been coupled to the LAN port 115. In the case in which the result of the determination is true (Yes in the step S1805), the program 422 goes ahead with the processing to the step S1806. On the other hand, in the case in which the result of the determination is false (No in the step S1805), the program 422 terminates the processing.

In the step S1806, the program 422 calculates an access lamp location from the X-coordinate view point 1034 the X-coordinate ending point 1035, the Y-coordinate view point 1036, and the Y-coordinate ending point 1037 of the access lamp location table 103 for the access lamp location ID 1031 that is included in the work contents.

In the step S1807, the program 422 determines whether or not an access lamp 114 of an access lamp location that has been calculated is lighting. This determination can also be carried out based on whether or not the augmented reality presenting apparatus 4 recognizes a light of an access lamp for instance. In the case in which the result of the determination is true (Yes in the step S1807), the program 422 goes ahead with the processing to the step S1808. On the other hand, in the case in which the result of the determination is false (No in the step S1807), the program 422 sets "False" to a success flag (S1809) and terminates the processing.

By the above configuration, it can be automatically detected whether or not the network cable 12a is coupled in a correct manner and can be in a communication enable state.

While an embodiment in accordance with the present invention have been described above, the present invention is not restricted to the above embodiment, and it is obvious that various changes and modifications can be thus made without departing from the scope of the present invention.

For instance, a tag can also be added to each of the LAN ports 115. In this case, in such a manner that a worker can immediately confirm that a tag and a LAN port 115 to which the tag is corresponded to a LAN port 115 can also be added to the neighborhood of the LAN port 115 for instance.

In the above embodiment, a work is defined in a unit of a port by the work list table 234, and the coupling of a network cable 12a and LAN ports 115 is configured in the work. However, such a detailed configuration is not necessary. Moreover, the work list table 234 can also be dynamically updated based on a network design table. For instance, in the case in which it is confirmed that it is necessary that a network apparatus A and a network apparatus B is coupled to each other and any one of network cables (hereafter referred to as a cable A) has been coupled to a LAN port A of the network apparatus A, the work contents that are indicated by the work list table 234 can also be updated to be "couple the cable A to the network apparatus B" based on the work results and the network design/topology table 231. As described above, the update of the work list table 234 in accordance with a procedure of a work can also be similar to that for other elements such as a LAN port.

In the above descriptions, the information that is transmitted from the network management apparatus 2 to the augmented reality presenting apparatus 4 and that includes the information that is a basis of a guide that is overlay-displayed can also be interpreted as an example of the guide information. Moreover, a guide based on the guide information can also be output by a display of an image (a moving image or a still image) or a playback of a voice as substitute for or in addition to a message display.

In the above descriptions, the augmented reality presenting apparatus 4 executes a determination or the like by using the first information that has been received from the network management apparatus 2 and the second information that has been acquired by the apparatus 4. However, the determination or the like can also be executed by the network management apparatus 2 as substitute for the augmented reality presenting apparatus 4. For instance, the network management apparatus 2 can also receive the second information from the augmented reality presenting apparatus 4 and execute a determination or the like by using the first information that has been acquired by the apparatus 2 and the second information that has been received. Similarly, the network management apparatus 2 executes a determination or the like by using the third information that has been received from the augmented reality presenting apparatus 4 and the fourth information that has been acquired by the apparatus 2. However, the determination or the like can also be executed by the augmented reality presenting apparatus 4 as substitute for the network management apparatus 2. For instance, the augmented reality presenting apparatus 4 can also receive the fourth information from the network management apparatus 2 and execute a determination or the like by using the third information that has been acquired by the apparatus 4 and the fourth information that has been received.

In the above descriptions, the network management apparatus 2 or the augmented reality presenting apparatus 4 can identify a location of a lamp that is corresponded to a target port based on the information of the appearance information table 233 and an input image that has been input through a video camera 46 and can confirm a coupling status (and a communication status) from a lighting mode of a lamp. Moreover, in the case in which the network management apparatus 2 can communicate with a network apparatus 11 of a work target (hereafter referred to as a target apparatus), the network management apparatus 2 can notify the target apparatus 11 of an ID of a port for communicating with the other apparatus 11 that is to be a coupled destination of the target apparatus 11 (a port of the target apparatus 11) and make the target apparatus 11 to check whether or not a communication with the other apparatus 11 via the port can be executed. In addition, by receiving the check results from the target apparatus 11, the network management apparatus 2 can judge whether or not the target apparatus 11 and the other apparatus 11 can communicate with each other (are coupled to each other). Moreover, in the case in which the network management apparatus 2 can communicate with the other apparatus 11, the network management apparatus 2 can notify the other apparatus 11 of an ID of a port for communicating with the target apparatus 11 that is to be a coupled destination of the other apparatus 11 (a port of the other apparatus 11) and make the other apparatus 11 to check whether or not a communication with the target apparatus 11 via the port can be executed. In addition, by receiving the check results from the other apparatus 11, the network management apparatus 2 can judge whether or not the target apparatus 11 and the other apparatus 11 can communicate with each other (are coupled to each other).

REFERENCE SIGNS LIST

1: Computer system
2: Network management apparatus
3: Web client apparatus
4: Augmented reality presenting apparatus
10: Management target network
11: Network apparatus

The invention claimed is:

1. A network construction support system, comprising:
a network management apparatus that is configured to manage a plurality of network apparatuses that are provided with a plurality of ports to which a plurality of network cables can be coupled and to store the work information; and
an augmented reality presenting apparatus that is configured to communicate with the network management apparatus,
wherein the augmented reality presenting apparatus is configured to execute at least one of the storing of a pre-work evidence image that is a shot image before a work in the case in which the work target is shot before a work and the storing of a post-work evidence image that is a shot image after a work in the case in which the work target is shot after a work; and to
transmit the pre-work shot image that has been stored or the post-work shot image that has been stored to the network management apparatus,
wherein a tag is added to each of the network apparatuses and each of the network cables,
wherein each of the tags is provided with a visible object that conforms to the tag information that includes an ID of the network apparatus to which a tag has been added or the network cable to which a tag has been added,
wherein the augmented reality presenting apparatus is provided with a shooting device and a display device and is configured to display an input image that is input by the shooting device on the display device,
wherein the augmented reality presenting apparatus is configured to transmit the tag information that is identified from the visible object that is shown in the input image of a tag that has been added to a work target of the plurality of network apparatuses and the plurality of network cables or a tag shot image that is an input image of the tag to the network management apparatus,
wherein the work information is configured to include the information that indicates a relationship between the tag information and the work target and the information that indicates the contents of a work that is to be executed for the work target, wherein the network management apparatus is configured to:
receive the tag information of the work target or the tag shot image of the work target from the augmented reality presenting apparatus;
create the guide information that includes the information that indicates the contents of a work for the work target based on the tag information that has been received or the tag shot image that has been received and the work information; and
transmit the guide information that has been created to the augmented reality presenting apparatus,
wherein the augmented reality presenting apparatus is configured to:
receive the guide information from the network management apparatus; and
associate a guide that is based on the guide information that has been received with an input image that is an image that is input from the shooting device, and display the guide and the input image that has been associated with the guide on the display device.

2. A network construction support system according to claim 1, wherein:
the augmented reality presenting apparatus is configured to shoot an image of the work target in the case in which a success of a work for the work target is identified by the augmented reality presenting apparatus or the network management apparatus based on a coupling status that is related to the work target and the work information, and
the shot image that is stored by the shooting is the post-work shot image.

3. A network construction support system according to claim 2, wherein:
the augmented reality presenting apparatus is configured to shoot an image of the work target in the case in which the work target that is corresponded to the tag information or the tag shot image is identified from the work information by the augmented reality presenting apparatus or the network management apparatus, and
the shot image that is stored by the shooting is the pre-work shot image.

4. A network construction support system according to claim 3, wherein:
the network management apparatus is configured to receive the pre-work shot image or the post-work shot image and temporarily store the image that has been received, and
the network management apparatus is configured to preserve the image that has been temporarily stored in the case in which the augmented reality presenting apparatus or the network management apparatus identifies that the work contents that are equivalent to the work contents that are indicated by the work information for the work target are executed and the coupling status that is related to the work target is correct.

5. A network construction support system according to claim 4, wherein:
the network management apparatus is configured to store the appearance information that is information that is related to an appearance of the network apparatus,
the appearance information is configured to include the information that indicates a standard location for the network apparatus and a port location that is a comparative location of a port to the standard location,
the augmented reality presenting apparatus is configured to associate a first guide that indicates a target port with a first input image in which a range that includes the target port of a network cable as the work target and a standard location for the network apparatus that is provided with the target port is shown, and to display the first input image and the first guide, and the first guide is configured to be associated with the target port that is shown in the first input image.

6. A network construction support system according to claim 5, wherein the first guide is configured to include at least one of an emphasis of a range that includes a location of a target port for the first input image and the information that includes the contents of a work in which the work target is executed to the target port.

7. A network management apparatus that is configured to manage a plurality of network apparatuses that are provided with a plurality of ports to which a plurality of network cables can be coupled, comprising:

a communication interface device that is configured to communicate with an augmented reality presenting apparatus;

a memory; and a processor that is coupled to the communication interface device and the memory, wherein a tag is added to each of the network apparatuses and each of the network cables, wherein each of the tags is provided with a visible object that conforms to the tag information that includes an ID of the network apparatus to which a tag has been added or the network cable to which a tag has been added, wherein the augmented reality presenting apparatus is provided with a shooting device and a display device and is configured to display an input image that is input by the shooting device on the display device, wherein the memory is configured to store the work information, wherein the work information is configured to include the information that indicates a relationship between the tag information and the work target and the information that indicates the contents of a work that is to be executed for the work target, wherein the processor is configured to:

receive the tag information that is identified from the visible object that is shown in the input image of a tag that has been added to a work target of the plurality of network apparatuses and the plurality of network cables or a tag shot image that is an input image of the tag from the augmented reality presenting apparatus;

create the guide information that includes the information that indicates the contents of a work for the work target based on the tag information that has been received or the tag shot image that has been received and the work information; and transmit the guide information that has been created to the augmented reality presenting apparatus, wherein the augmented reality presenting apparatus is configured to:

receive the guide information from the network management apparatus;

to associate a guide that is based on the guide information that has been received with an input image that is an input image that is input from the shooting device, and display the guide and the input image that has been associated with the guide on the display device, and further wherein the augmented reality presenting apparatus is configured to execute at least one of the storing of a pre-work evidence image that is a shot image before a work in the case in which the work target is shot before a work and the storing of a post-work evidence image that is a shot image after a work in the case in which the work target is shot after a work, and the processor is configured to receive the pre-work shot image or the post-work shot image from the augmented reality presenting apparatus.

8. A network management apparatus according to claim 7, wherein:

the processor is configured to execute any one of identifying a success of a work for the work target based on a coupling status that is related to the work target and the work information and transmitting at least part of the work information to the augmented reality presenting apparatus, the augmented reality presenting apparatus is configured to shoot an image of the work target in the case in which a success of a work for the work target is identified by the augmented reality presenting apparatus or the processor based on a coupling status that is related to the work target and the work information, and the shot image that is stored by the shooting is the post-work shot image.

9. A network management apparatus according to claim 7, wherein:

the processor is configured to execute any one of identifying the work target that is corresponded to the tag information or the tag shot image from the work information and transmitting at least part of the work information to the augmented reality presenting apparatus, the augmented reality presenting apparatus is configured to shoot an image of the work target in the case in which the work target that is corresponded to the tag information or the tag shot image is identified from the work information by the augmented reality presenting apparatus or the processor, and the shot image that is stored by the shooting is the pre-work shot image.

10. A network management apparatus according to claim 7, wherein:

the processor is configured to receive the pre-work shot image or the post-work shot image and temporarily store the image that has been received into the memory, and the processor is configured to preserve the image that has been temporarily stored in the case in which the augmented reality presenting apparatus or the processor identifies that the work contents that are equivalent to the work contents that are indicated by the work information for the work target are executed and the coupling status that is related to the work target is correct.

* * * * *